United States Patent
Yoon et al.

(10) Patent No.: US 9,127,203 B2
(45) Date of Patent: Sep. 8, 2015

(54) FLUORESCENT SUBSTANCE, LIGHT EMITTING DEVICE, SURFACE LIGHT SOURCE DEVICE, DISPLAY DEVICE AND ILLUMINATING DEVICE

(75) Inventors: Chang Bun Yoon, Gyunggi-do (KR); Hyong Sik Won, Gyunggi-do (KR); Chul Soo Yoon, Gyunggi-do (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 339 days.

(21) Appl. No.: 13/578,779

(22) PCT Filed: Feb. 11, 2011

(86) PCT No.: PCT/KR2011/000920
§ 371 (c)(1),
(2), (4) Date: Aug. 13, 2012

(87) PCT Pub. No.: WO2011/099800
PCT Pub. Date: Aug. 18, 2011

(65) Prior Publication Data
US 2012/0306356 A1    Dec. 6, 2012

(30) Foreign Application Priority Data
Feb. 12, 2010   (KR) .................. 10-2010-0013626

(51) Int. Cl.
*C09K 11/79*   (2006.01)
*C09K 11/80*   (2006.01)
(Continued)

(52) U.S. Cl.
CPC .......... *C09K 11/7734* (2013.01); *C04B 35/597* (2013.01); *C09K 11/0883* (2013.01);
(Continued)

(58) Field of Classification Search
CPC .................. C09K 11/7734; C09K 11/0883
USPC ............. 313/501–503; 252/301.6 F, 301.4 F
See application file for complete search history.

(56) References Cited

U.S. PATENT DOCUMENTS

2006/0061252 A1   3/2006   Sohn et al.
2007/0108896 A1   5/2007   Hirosaki
(Continued)

FOREIGN PATENT DOCUMENTS

| CN | 1839191 A | 9/2006 |
|---|---|---|
| JP | 60-206889 A | 10/1985 |

(Continued)

OTHER PUBLICATIONS

Chinese Office Action with English translation issued in Chinese Application No. 201180018736.6 dated Jul. 26, 2013.
(Continued)

*Primary Examiner* — Karabi Guharay
(74) *Attorney, Agent, or Firm* — McDermott Will & Emery LLP

(57) ABSTRACT

There is provided a phosphor having a β-type $Si_3N_4$ crystal structure including oxynitride expressed by an empirical formula $Si_{6-z}Al_zO_zN_{8-z}:Eu_a,M_b$, M being at least one selected from among strontium (Sr) and barium (Ba), an amount (a) of europium (Eu) ranging from 0.1 to 5 mol %, an amount (b) of M ranging from 0.1 to 10 mol %, and a composition rate (z) of aluminum (Al) satisfying $0.1<z<1$, and the phosphor emitting light having a peak wavelength ranging from 500 to 550 nm when excitation light is irradiated thereto.

49 Claims, 21 Drawing Sheets

(51) Int. Cl.
*C09K 11/77* (2006.01)
*C04B 35/597* (2006.01)
*C09K 11/08* (2006.01)

(52) U.S. Cl.
CPC . *C04B2235/3206* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3865* (2013.01); *C04B 2235/3873* (2013.01); *C04B 2235/442* (2013.01)

(56) References Cited

U.S. PATENT DOCUMENTS

| | | |
|---|---|---|
| 2007/0166218 A1 | 7/2007 | Hirosaki et al. |
| 2008/0128735 A1 | 6/2008 | Yoo et al. |
| 2009/0050845 A1 | 2/2009 | Hirosaki et al. |
| 2010/0219741 A1 | 9/2010 | Kawasaki et al. |
| 2011/0220871 A1* | 9/2011 | Kamikawa et al. .......... 257/13 |
| 2011/0234118 A1* | 9/2011 | Kim et al. .................. 315/291 |

FOREIGN PATENT DOCUMENTS

| | | |
|---|---|---|
| JP | 2005-255895 A | 9/2005 |
| JP | 2005-306692 A | 11/2005 |
| JP | 3921545 B2 | 5/2007 |
| JP | 3975451 B2 | 9/2007 |
| KR | 10-2005-0111666 A | 11/2005 |
| KR | 2006-0027504 A | 3/2006 |
| KR | 10-2007-0021140 A | 7/2007 |
| KR | 10-2007-0116697 A | 12/2007 |
| KR | 2009-0028724 A | 3/2009 |
| KR | 10-2009-0113354 A | 10/2009 |
| WO | WO-2006-121083 A1 | 11/2006 |

OTHER PUBLICATIONS

Xie, Rong-Jun et al. "Fluorescence of Eu2+ in Strontium Oxonitridoaluminosilicates (SiAlONS)." Journal of the Ceramic Society of Japan. pp. 462-465. Apr. 21, 2005.

International Search report mailed Oct. 25, 2011 issued in corresponding International Application No. PCT/KR2011/000920.

Japanese Office Action issued in Japanese Application No. 2012-552807 dated Feb. 3, 2015.

* cited by examiner

FLUORESCENT SUBSTANCE, LIGHT EMITTING DEVICE, SURFACE LIGHT SOURCE DEVICE, DISPLAY DEVICE AND ILLUMINATING DEVICE

RELATED APPLICATIONS

This application is the U.S. National Phase under 35 U.S.C. §371 of International Application No. PCT/KR2011/000920, filed on Feb. 11, 2011, which in turn claims the benefit of Korean Application No. 10-2010-0013626, filed on Feb. 12, 2010, the disclosures of which Applications are incorporated by reference herein.

TECHNICAL FIELD

The present invention relates to a phosphor, and more particularly, to a β-sialon phosphor having high light emission characteristics, excellent thermal and chemical stability, and a light emitting device using the same, a surface light source apparatus, a display apparatus, and an illumination device.

BACKGROUND ART

In general, a wavelength conversion phosphor material is used to convert a certain wavelength of light from various light sources into a desired wavelength of light. In particular, a light emitting diode (LED), among various light sources, is able to be driven with low power consumption and has excellent light efficiency, so it may be effectively applied to an LCD backlight, a vehicle lighting system, and a home illumination system. Recently, a phosphor material has been recognized as a core technology in the manufacturing of a white light emitting device (LED).

The white light emitting device is generally manufactured using a scheme of covering a blue LED with a yellow phosphor. In detail, white light may be produced by covering a light emission surface of a blue LED having a GaN/InGaN active layer with a yellow YAG($Y_3Al_5O_{12}$):Ce phosphor to convert a certain amount of blue light into a yellow light, such that the converted yellow light and non-wavelength converted blue light may be combined to thereby provide white light.

The white light emitting device configured with the above-mentioned YAG:Ce phosphor (or, TAG-based phosphor)-blue LED according to the related art has low color rendering. That is, since a wavelength of the white light produced using the yellow phosphor is distributed in only blue and yellow colors, the color rendering is relatively low, and thus, there is a limitation in implementing desired natural white light.

Meanwhile, a wavelength conversion phosphor material according to the related art has been used in a limited fashion in a light emission color of a particular light source and color of a particular output light, and a color distribution able to be implemented is also very limited, such that there are limitations in the application thereof to light emission colors of various light sources and/or the colors of various output light.

With regard to the defects described above, an excellent color rendering index (CRI) and a relatively high color distribution have recently been implemented through a mixture of three kinds of particular blue, green and red phosphors through the disclosure of Korean Patent Application No. 2004-0076300 (Filed Sep. 23, 2004). In order to implement an excellent light emitting device through the composition of red, green and blue phosphors, respective phosphors are all required to have relatively high conversion efficiency.

In addition, a silicate phosphor according to the related art is unstable when heated, such that it is vulnerable to failure when used in conjunction with a high-output LED chip.

In the case of defects, research into a β-sialon phosphor has been continuously conducted since the initial proposal for a new phosphor material was disclosed in Japanese Patent Laid-Open Publication 60-206889 (Published Oct. 18, 1985).

Japanese Patent Registration No. 3921545 (Published Mar. 2, 2007, Patentee: National Institute for Materials Science) proposes using β-sialon as a green light emitting phosphor, but there are difficulties in practical implementation, because the brightness thereof is very low and wavelength and color coordinate characteristics are not appropriate to implement a desired white light.

Meanwhile, a scheme for finding new properties of a β-sialon phosphor by transforming a basic crystal structure thereof has been reported. A thesis, "Fluorescence of $Eu_+$ in SiAlONs" (2005, Journal of the Ceramic Society of Japan, R. J. Xie, et al.) proposes a strontium (Sr) sialon provided by substituting Sr in place of Si or Al in the crystal structure. However, since Sr is substituted in the crystal structure, phase stability is relatively low and it is difficult to expect thermal stability.

In addition, Korean Patent Laid-Open Publication 2009-0028724 proposes β-sialon (SiAlON) as a green phosphor, but since there are disadvantages in which a particle size is relatively large, precipitation speed is rapid and dispersion of color coordinates based on the kind of product is relative large. Further, in a manufacturing process, a high firing temperature, for example, 2000° C. or more, and a long firing time in comparison with the firing condition of a silicate phosphor according to the related art, for example, a temperature of about 1600° C. and about 3 hours may be required. Due to these disadvantages, difficulties in adding group I and II elements as an active agent may be caused.

DISCLOSURE

Technical Problem

An aspect of the present invention provides a phosphor for an emission of green light, which is capable of being used in a high output LED chip due to high light emission efficiency, has excellent color reproducibility and thermal stability, and a method of manufacturing the same.

An aspect of the present invention also provides a white light emitting device using the phosphor described above, a surface light source apparatus, an illumination device and a display device.

Technical Solution

According to an aspect of the present invention, there is provided a phosphor having a β-type $Si_3N_4$ crystal structure and including oxynitride expressed by an empirical formula $Si_{6-z}Al_zO_zN_{8-z}:Eu_a,M_b$, wherein M is at least one selected from among strontium (Sr) and barium (Ba), an amount (a) of europium (Eu) ranges from 0.1 to 5 mol %, an amount (b) of M ranges from 0.1 to 10 mol %, and a composition rate (z) of aluminum (Al) satisfies 0.1<z<1, and the phosphor emitting light having a peak wavelength ranging from 500 to 550 nm when excitation light is irradiated thereto.

The excitation light source may have a peak wavelength ranging from 300 to 480 nm. Further, a peak wavelength of the light emitted from the phosphor may be 540 nm or less when the phosphor is irradiated by the excitation light.

When the light emitted from the phosphor due to the irradiated excitation light source is represented as an (x, y) value in CIE 1931 chromaticity coordinates, x and y may respectively satisfy x≤0.336 and y≥0.637.

In the CIE 1931 chromaticity coordinates of the light emitted from the phosphor, the amount of change of y may be −0.0065 or less. Herein, for example, when a value of y is y1 in the CIE 1931 chromaticity coordinates, measured from the light emitted from the phosphor on the condition of driving a blue light emitting diode having the phosphor applied thereto at 3.3 V, 120 mA, and a value of y is y2 in the CIE 1931 chromaticity coordinates, measured from the light emitted after the above driving condition is continuously performed for 24 hours at 85° C.; the amount of change of y may be defined as y2−y1.

In an embodiment of the present invention, M may be strontium (Sr). In this case, the amount (a) of strontium (Sr) may range from 0.5 to 3 mol %, and may preferably range from 1 to 1.5 mol %.

In addition, the composition rate (z) of aluminum (Al) may range from 0.1 to 0.3 mol %. The amount (b) of europium (Eu) may range from 0.9 to 3 mol %.

In another embodiment of the present invention, M may contain both Barium (Ba) and strontium (Sr).

A value D50 in a grain size of the phosphor powder may range from 14.5 to 18.5 μm.

In another embodiment of the present invention, the phosphor may be an activator and further contain at least one element selected from a group consisting of lithium (Li), natrium (Na), kalium (K), magnesium (Mg) and calcium (Ca).

Here, the amount (a) of europium (Eu) and the amount (b) of M may also be restricted by the unit of ppm. That is, it may be respectively represented that the amount (a) of europium (Eu) ranges from 100 to 5000 ppm, while the amount (b) of M ranges from 100 to 10000 ppm.

According to another aspect of the present invention, there is provided a method of producing a phosphor to manufacture an oxynitride phosphor having a β-type $Si_3N_4$ crystal structure and expressed by an empirical formula $Si_{6-z}Al_zO_zN_{8-z}$: $Eu_a,M_b$, M being at least one selected from among strontium (Sr) and barium (Ba), an amount (a) of europium (Eu) ranging from 0.1 to 5 mol %, an amount (b) of M ranging from 0.1 to 10 mol %, and a composition rate (z) of aluminum (Al) satisfying 0.1<z<1, the method comprising: weighing raw materials including an Si-containing oxide or nitride, an Al-containing oxide or nitride, an Eu-containing compound and an M-containing compound; preparing a primary mixture by mixing the raw materials, excepting the M-containing compound; primarily firing the primary mixture and grinding the primarily fired mixture; preparing a secondary mixture by mixing the M-containing compound with the ground mixture; and secondarily firing the secondary mixture and grinding the secondarily fired mixture.

The primary firing process may be performed in a firing temperature range of 1850 to 2300° C., and the secondary firing process may be performed at a temperature lower than that of the primary firing process. The primary and secondary firing processes may be performed under an atmosphere of nitrogen gas.

The preparing of the secondary mixture may include adding a compound containing at least one element selected from a group consisting of Li, Na, K, Mg and Ca, as an activator together with the M-containing compound.

According to another aspect of the present invention, there is provided a white light emitting device including: an LED chip emitting excitation light; a green phosphor disposed around the LED chip to wavelength-convert at least a portion of the excitation light and including a β-sialon phosphor; and at least one light emitting element emitting light of a wavelength different from a wavelength of the LED chip and different from a wavelength of the green phosphor, the at least one light emitting element being at least one of an additional LED chip and a different type of phosphor.

The LED chip may be an LED chip emitting ultraviolet light, or an LED chip emitting visible light having a peak wavelength greater than 470 nm.

Meanwhile, the LED chip may be a blue LED chip having a peak wavelength ranging from 430 nm to 470 nm.

In this case, the at least one light emitting element may include a red phosphor. A light emission wavelength peak of the red phosphor may range from 600 nm to 660 nm, and a light emission wavelength peak of the green phosphor may range from 500 nm to 550 nm. In addition, the blue LED chip may have a full width of a half maximum (FWHM) ranging from 10 nm to 30 nm, the green phosphor may have a FWHM ranging from 30 nm to 100 nm, and the red phosphor may have a full width of a half maximum (FWHM) ranging from 50 nm to 150 nm.

Further, the light emission wavelength peak of the green phosphor may range from 535 nm to 545 nm, and a full width of a half maximum (FWHM) of the light emission wavelength may range from 60 nm to 80 nm.

In the CIE 1941 color coordinate system, a color coordinate of light emitted from the red phosphor is within the range of 0.55≤x≤0.65 and 0.25≤y≤0.35, respectively, and a color coordinate of light emitted from the blue LED chip is within the range of 0.1≤x≤0.2 and 0.02≤y≤0.15, respectively.

In another embodiment of the present invention, the red phosphor may be at least one selected from among a nitride-based phosphor of $M1AlSiN_x$:Re(1≤x≤5), a sulfide-based phosphor of M1D:Re, and a silicate-based phosphor of $(Sr, L)_2SiO_{4-x}N_y$:Eu (Here, 0≤x≤4, y=2x/3). Here, M1 is at least one element selected from among barium (Ba), strontium (Sr), calcium (Ca), and magnesium (Mg), D is at least one element selected from among sulfur (S), selenium (Se), and tellurium (Te) L is at least one group II element selected from a group consisting of Ba, Ca and Mg, or at least one group I element selected from a group consisting of lithium (Li), sodium (Na), potassium (K), rubidium (Rb), and cesium (Cs), and Re is at least one selected from among yttrium (Y), lanthanum (La), cerium (Ce), neodymium (Nd), promethium (Pm), samarium (Sm), gadolinium (Gd), terbium (Tb), dysprosium (Dy), holmium (Ho), erbium (Er), thulium (Tm), ytterbium (Yb), lutetium (Lu), F, chlorine (Cl), bromine (Br), and iodine (I).

The at least one light emitting element may further include a yellow and a yellowish-orange phosphor. In this case, the yellow and the yellowish-orange phosphor may be a silicate-based phosphor, a garnet-based phosphor of YAG and TAG, a sulfide-based phosphor or a α-SiAlON:Re phosphor.

Meanwhile, the at least one light emitting element may be a red LED chip.

In an embodiment of the present invention, the LED chip may have a structure in which first and second electrodes are disposed to face the same surface. In another embodiment of the present invention, the LED chip may have a structure in which the respective first and second electrodes are disposed to face different surfaces opposed to each other.

In another embodiment of the present invention, the LED chip may include: a semiconductor stacked body having first and second conductive semiconductor layers providing first and second main surfaces opposed to each other and an active layer formed between the first and second conductive semiconductor layers, a contact hole connected to one area of the first conductive semiconductor layer from the second main surface through the active layer, a first electrode formed on the second main surface of the semiconductor stacked body and connected to one area of the first conductive semiconductor layer through the contact hole, and a second electrode formed on the second conductive semiconductor layer formed on the second main surface of the semiconductor stacked body to be connected to the second conductive semiconductor layer.

In this case, any one of the first and second electrodes may be exposed to a side surface of the semiconductor stacked body.

The white light emitting device may further include a package main body having a recess in which the LED chip is mounted.

The white light emitting device may further include a resin packaging part encapsulating the LED chip, and at least one of the plurality of phosphors may be dispersed in the resin packaging part. The plurality of phosphors may respectively form a plurality of different phosphor-contained resin layers, and the plurality of phosphor-contained resin layers may have a stacked structure.

A color rendering index (CRI) of white light emitted from the white light emitting device may be 70 or higher.

According to another aspect of the present invention, there is provided a surface light source apparatus using the foregoing phosphor as a wavelength conversion material, a display apparatus, and an illumination device.

Advantageous Effects

A certain amount of strontium (Sr) may be added to an interstitial space (i.e., an air gap or pore) of a host matrix provided as the β-sialon crystal, to obtain a green phosphor having a luminance greatly improved by, e.g., approximately 20% and having a shorter wavelength as compared with the β-sialon phosphor according to the related art.

The green phosphor can provide color characteristics satisfying a standard RGB (sRGB) green area in the CIE 1931 color coordinate system, contributing to a provision of vivid (clear, sharp) white light. Also, the addition (or doping) of strontium (Sr) can contribute to a phase stabilization of β-sialon, improving the reliability thereof, in particular, significantly reducing a change in a y color coordinate which holds sway over an efficiency change over time, and obtaining a great improvement effect in the aspect of productivity and production yield.

In addition, the β-sialon phosphor provided according to an aspect of the present invention may be used together with other phosphors, for example, blue and red phosphors, in a light emitting device, thereby allowing for various color expressions and excellent color reproducibility therein. Moreover, at the time of implementing a white light emitting device, excellent white light can be obtained through a greatly improved color rendering index.

An oxynitride phosphor according to an aspect of the present invention may be used as a wavelength conversion material in various types of white light emitting devices, surface light source apparatuses, display apparatuses and illumination devices.

DESCRIPTION OF DRAWINGS

The above and other aspects, features and other advantages of the present invention will be more clearly understood from the following detailed description taken in conjunction with the accompanying drawings, in which.

MODE FOR INVENTION

Figure 1:
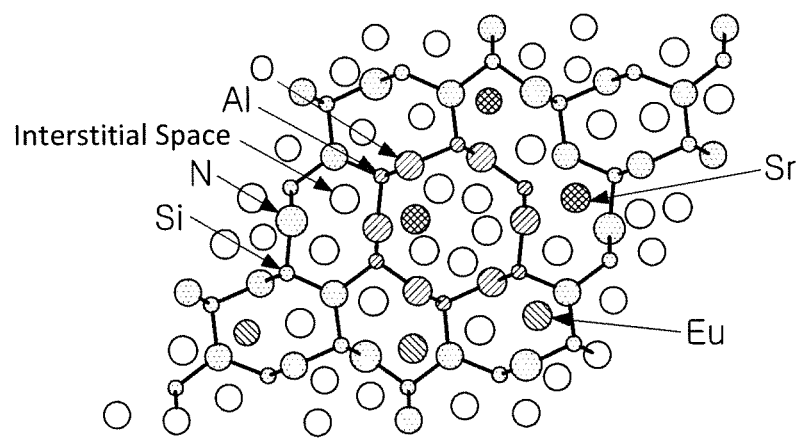
FIG. 1 is a view showing a crystal structure of a β-sialon phosphor according to an example of the present invention.

Embodiments of the present invention will now be described in detail with reference to the accompanying drawings such that they could be easily practiced by those having skill in the art to which the present invention pertains. However, in describing the embodiments of the present invention, detailed descriptions of well-known functions or constructions will be omitted so as not to obscure the description of the present invention with unnecessary detail.

In addition, like reference numerals denote like elements throughout the drawings.

Unless explicitly described to the contrary, the word "comprise" and variations such as "comprises" or "comprising," will be understood to imply the inclusion of stated elements but not the exclusion of other elements.

Hereinafter, embodiments of the present invention will be described in detail with reference to the accompanying drawings.

A phosphor according to an example of the present invention may have a β-type $Si_3N_4$ crystal structure and include oxynitride expressed by an empirical formula $Si_{6-z}Al_zO_zN_{8-z}:Eu_a,M_b$. The empirical formula may satisfy the following conditions.

1) M being at least one selected from among strontium (Sr) and barium (Ba),
2) An amount (a) of europium (Eu) ranging from 0.1 to 5 mol %,
3) An amount (b) of M ranging from 0.1 to 5 mol %, and
4) A composition rate (z) of aluminum (Al) satisfying $0.1 < z < 1$.

The phosphor according to an example of the present invention may be excited by a light wavelength occupying a blue region, including an ultraviolet region, to thus emit green light. That is, a phosphor for emitting light having a peak wavelength ranging from 500 to 550 nm, a green phosphor, may be provided when an excitation light having a peak wavelength ranging from 300 nm to 480 nm is irradiated thereto. In particular, in the case of excitation light in the ultraviolet (UV) band, a relatively high conversion efficiency may be expected.

Figure 2:
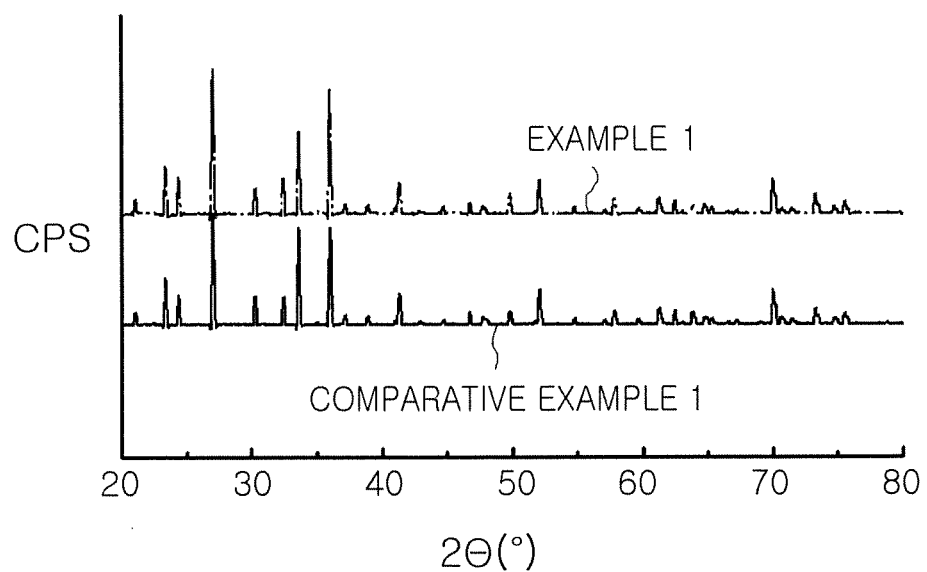
FIG. 2 is an XRD graph of a β-sialon phosphor prepared according to Example 1 of the present invention and Comparative Example 1.

As such, the phosphor according to the example of the present invention may be a β sialon-based phosphor provided by adding any one of Sr and Ba or both of Sr and Ba together with Eu, to an $Si_{6-z}Al_zO_zN_{8-z}$ host matrix having a β-type $Si_3N_4$ crystal structure. As shown in FIG. 1, Sr (or Ba) added together with Eu may be added to an interstitial space as a dopant in place of substituting an element, Si or Al, which forms a host matrix. That is, according to an example of the present invention, the addition of Sr or Ba may not transform the host matrix (Please refer to FIG. 2).

M, as at least one selected from Sr and Ba, may contribute to a phase stabilization of a β-sialon phosphor and a short wavelength of a phosphor, enhancing the reliability thereof and improving light emission efficiency.

The amount (b) of M may range from 0.1 to 5 mol %. In this case, for example, when the amount of Sr is below 0.1 mol %, an efficiency improvement effect and a short-wavelength effect may not be sufficient, and when exceeding 5 mol %, the efficiency thereof may be deteriorated as compared to a phosphor to which Sr is not added. Therefore, the amount (a) of Sr may range from 0.5 to 3 mol %, and preferably, range from 1 to 1.5 mol %. In particular, rather than the case in which M is not added, the case in which M is added is improved by 20% or more in the luminance of the light emitting element, therefore a relatively high conversion efficiency can be expected.

In the phosphor according to the above-mentioned empirical formula it may be that a peak wavelength of light emitted from the phosphor is altered to have a relatively short wavelength of 540 nm or below when excitation light is irradiated thereto. Therefore, green wavelength characteristics required in the standard RGB may satisfy a relatively high level. That is, when light emitted from the phosphor due to the irradiated excitation light is represented as a (x, y) value in CIE 1931 chromaticity coordinates, since x and y respectively satisfy $x \leq 0.336$ and $y \geq 0.637$, a green phosphor capable of providing vivid white light can be usefully utilized.

As described above, since an M dopant selected according to the example of the present invention may be added to the interstitial space, the β-sialon phosphor may be phase stabilized at a relatively efficiency, reducing a change in efficiency over time. In general, the efficiency change over time may depend upon a y color coordinate.

When the amount of change in the y color coordinate according to a measuring method is applied to a blue light emitting diode and a y value in the CIE 1931 chromaticity coordinates measured from light emitted at a driving starting time at 3.3 V and 120 mA is indicated as y1, and a y value in the CIE 1931 chromaticity coordinates measured from light emitted after the above-mentioned driving condition lasts at 85° C. for 24 hours is indicated as y2; the amount of change of y may be defined as y2−y1. In this case, the amount of change in y in the CIE 1931 chromaticity coordinates in light emitted from the phosphor may be −0.0065 or below.

According to another example of the present invention, a method of manufacturing the above-described phosphor is described below.

First, raw materials including an Si-containing oxide or nitride, an Al-containing oxide or nitride, an Eu-containing compound and an M-containing compound, to satisfy a desired stoichiometry required in the above-mentioned empirical formula, may be weighted.

Subsequently, a primary mixture may be prepared by mixing the raw materials excepting the M-containing compound. Then, the primary mixture may be primarily fired and the primarily fired mixture may be milled. A secondary mixture may be then prepared by mixing the M-containing compound with the crushed primary mixture. Subsequently, the secondary mixture may be secondarily fired and then milled, thereby obtaining the β-sialon phosphor described above. In addition, the obtained phosphor may be pickling processed so as to increase the crystallization thereof.

In this example of the present invention, Sr may be added to the β-sialon host matrix through two firing processes. In addition, this process may be smoothly performed through the secondary firing process at a temperature lower than that of the primary firing process.

In particular, since the secondary firing process may be performed at a temperature lower than temperature ranging from 1850 to 2300° C. applied in the primary firing process, the second firing process may be performed by mixing a group I and II element-containing compound with the primarily fired mixture, thereby additionally adding group I and II elements as an additional activator. The addition of an activator can greatly contribute to the short wavelength in the phosphor. The group I and II elements may be an element selected from a group consisting of Li, Na, K, Mg and Ca.

Examples for respective processes in the method of manufacturing a phosphor according to an example of the present invention will be described in detail as follows.

Raw materials may be mixed using one of dry mixing and wet mixing methods.

First, according to the wet mixing method, the weighed mixture, a ball assisting in the mixing and crushing process of the raw materials, and a solvent may be inserted to a container and then mixed. In this case, as the ball, a ball made of a material such as silicon oxide ($Si_3N_4$) or zirconia ($ZrO_2$), or a ball generally used for mixing raw materials may be used. As the solvent, distilled water (D.I. water), an alcohol such as ethanol, or the like, an organic solvent such as hexane, or the like, may be all used. Namely, the raw materials, the solvent, and the ball may be put in the container, the container may be hermetically sealed, and the raw materials may be homogeneously mixed by using a device, such as a miller, or the like, for 1 to 24 hours. After the mixing process is completed, the mixed raw materials and ball are separated and the solvent contained therein may be mostly evaporated in an oven for 1 to 48 hours. After the drying process is completed, the obtained powder may be evenly classified by using a sieve made of a metal or a polymer under the conditions of a desired micrometer size.

Figure 18:
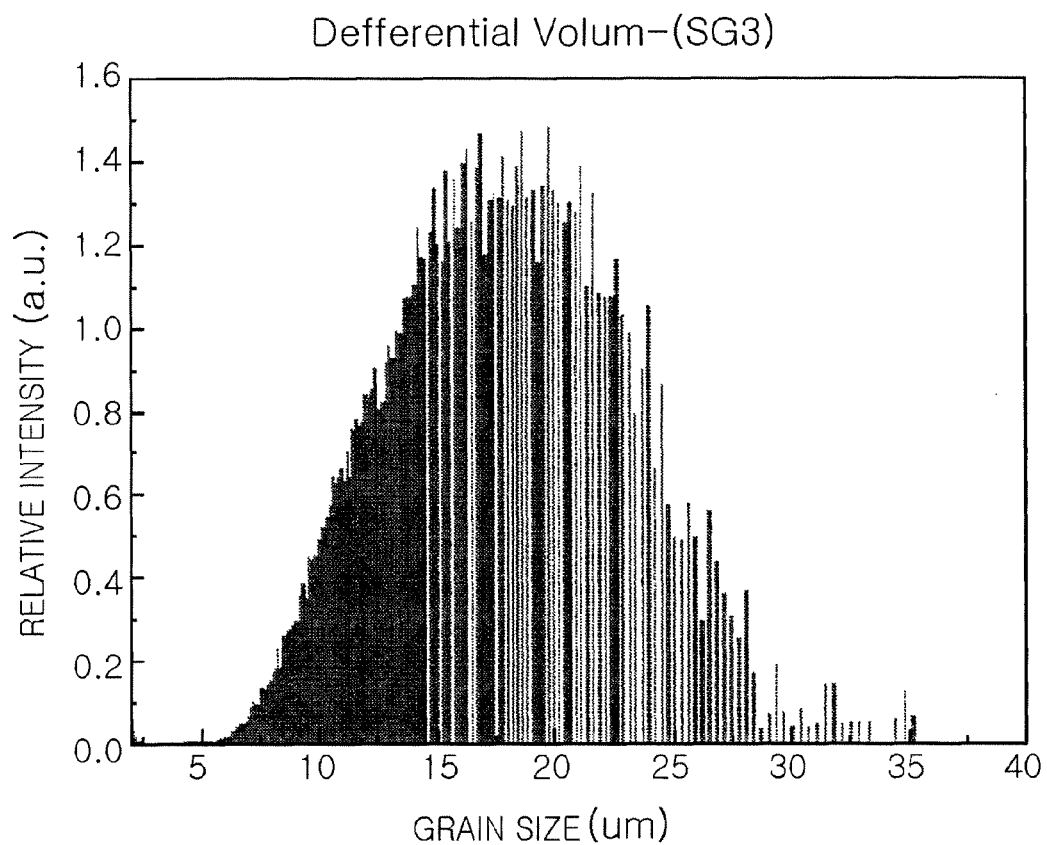
FIG. 18 is a graph showing the condition for a grain size of a β-sialon phosphor according to an example of the present invention.

Meanwhile, according to the dry mixing method, raw materials may be inserted into a container without using a solvent and may then be homogeneously mixed by using a milling machine. A mixing duration may be approximately 1 to 24 hours, and in this case, a ball may be inserted together with the raw materials to facilitate the mixing operation to thus shorten the mixing duration. The dry mixing method may be applied to reduce the overall processing time because it does not require a solvent drying process, compared with the wet mixing method. When the mixing of the raw materials is completed, like the wet mixing method, the obtained powder may be evenly classified by using a sieve made of a metal or a polymer under the condition of a desired micrometer size. A grain condition of the phosphor described above will be described below referring to FIG. 18.

The classified mixture powder may be put in a boron nitride (BN) crucible (or melting pot) and a firing process may be performed thereon. In this case, the firing process may be performed at a desired firing temperature (e.g., 1850 to 2300° C., 1000 to 1800° C.) for about 1 to 24 hours by using a heating furnace. The firing process may be performed under an atmosphere of 100% nitrogen ($N_2$) or a mixed nitrogen gas containing 1 to 10% of hydrogen. The synthesized phosphor powder may be homogeneously crushed by using a mortar or a crusher (or a mill, a grinder, etc.) and a post-thermal process may be repeatedly performed one to three times to improve the luminance of the phosphor.

Hereinafter, various examples of the present invention will be described in detail.

Example 1

Raw materials of $Si_3N_4$, AlN, $Al_2O_3$, $Eu_2O_3$, and $SrCO_3$ were weighed according to a stoichiometry rate satisfying a composition rate of the following Table 1 to prepare a raw materials group according to Example 1. A remainder of the raw materials, except $SrCO_3$, from the raw material group, was mixed with an ethanol solvent by using a ball mill.

The ethanol solvent in the raw mixture was volatilized by using a dryer, the dried primary raw mixture was inserted into the boron nitride (BN) crucible, and the boron nitride (BN) crucible filled with the primary raw mixture was inserted into a heating furnace and primarily fired at 2050° C. for 10 hours in a gaseous state under an N2 atmosphere.

The primarily fired mixture was crushed and the crushed mixture was secondarily mixed by inserting a weighed $SrCO_3$ thereinto by using the miller. Subsequently, the secondary mixture was again fired at 1750° C., thus manufacturing a phosphor based on the composition rate according to the Example 1. The manufactured phosphor was crushed and then subjected to a post-thermal treatment process and a pickling process to obtain a β-sialon phosphor of $Si_{5.8}Al_{0.2}O_{0.2}N_{7.8}{:}Eu_{0.0152},Sr_{0.01}$.

Comparative Example 1

With the exception of the Sr raw material from the above Example 1, the process was performed equally to the primary firing condition among the overall conditions of Example 1, and then, the obtained phosphor was crushed under the same condition as that of Example 1, and subsequently, a β-sialon phosphor of $Si_{5.8}Al_{0.2}O_{0.2}N_{7.8}{:}Eu_{0.0152}$ was prepared through a post-thermal treatment process and a pickling process.

First, an XRD analysis for the β-sialon phosphor according to Example 1 and Comparative example 1 was carried out. The analysis result is shown in an XRD graph of FIG. 1.

As shown in FIG. 1, it may be appreciated that the β-sialon phosphor containing Sr, according to Example 1 and the β-sialon phosphor not containing Sr according to Comparative example 1, have the same crystal peak as each other. That is, the β-sialon phosphors according to Example 1 and Comparative example 1 all may have the same β-type $Si_3N_4$ crystal structure.

As such, it may be confirmed that Sr added according to Example 1 does not affect the crystal structure.

In addition, in order to confirm that Sr was added according to Example 1, a TOF-SIMS measurement to detect an Sr density was performed.

Figure 3:
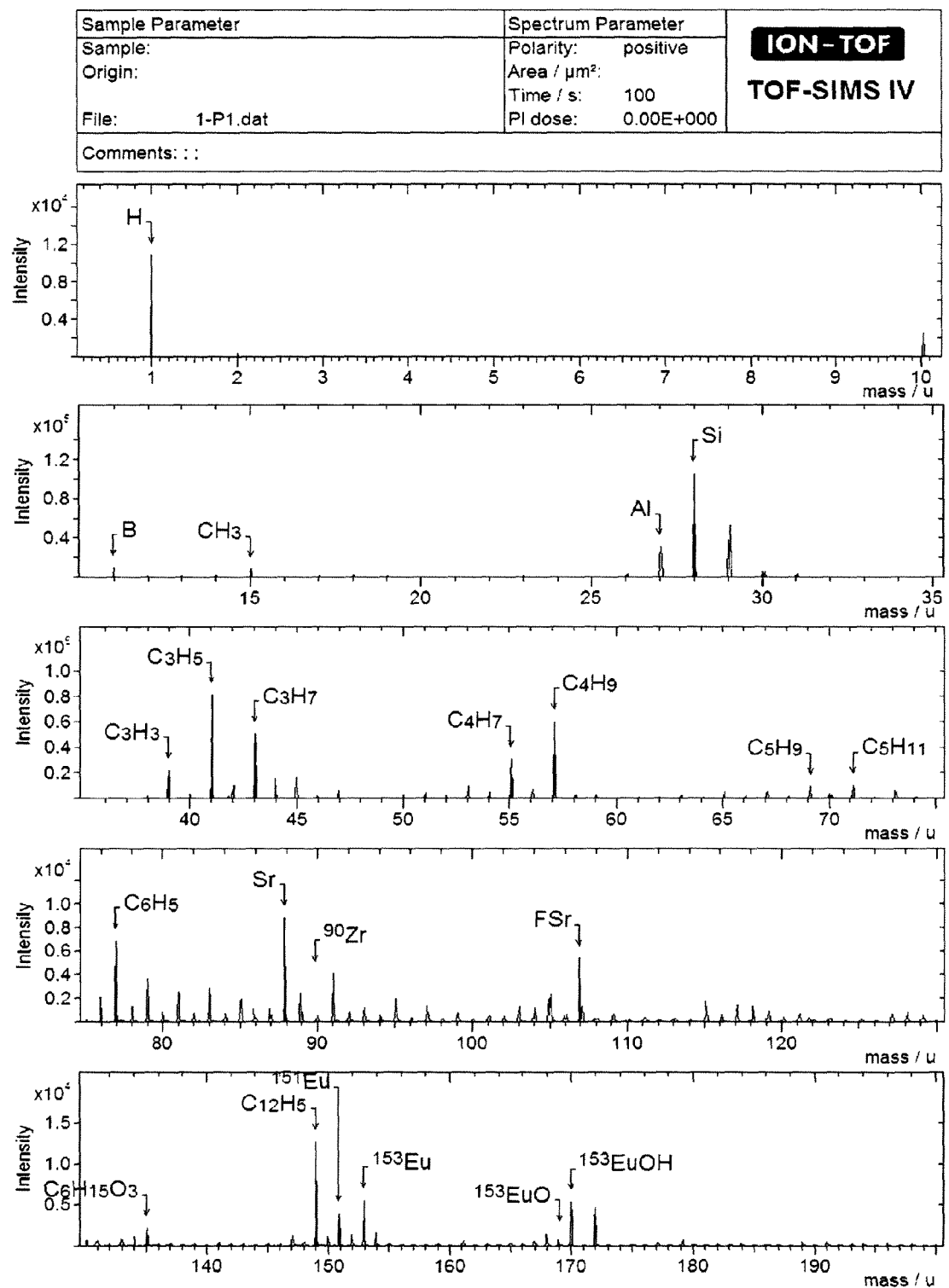
FIGS. 3 and 4 are charts provided by analyzing constructive atoms of each β-sialon phosphor using TOF-SIMS according to Example 1 of the present invention and Comparative Example 1.
Figure 4:
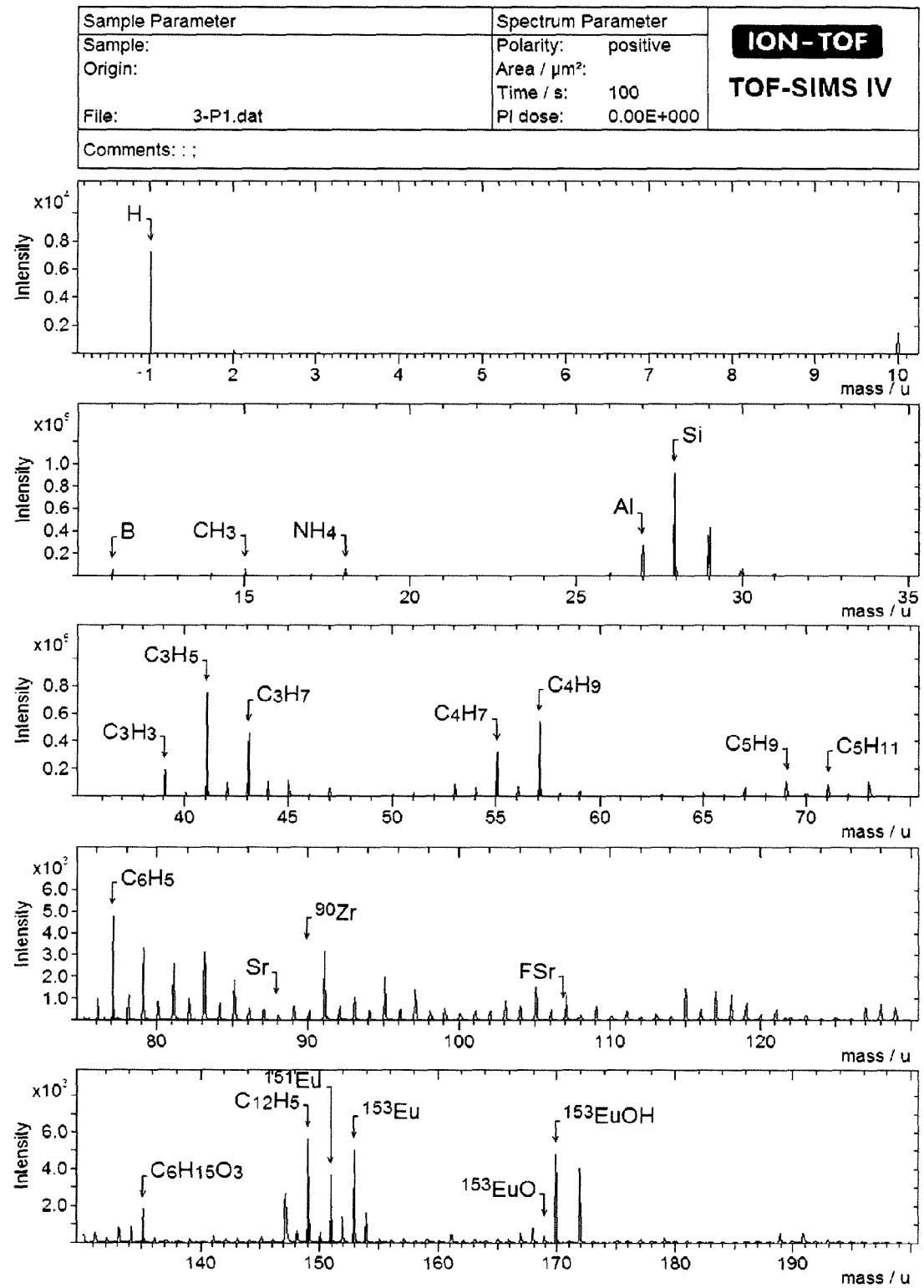

The detection of Sr was not shown in a graph of FIG. 4 according to Comparative Example 1, but it was confirmed that Sr has been doped (please refer to the fourth chart) referring to FIG. 3 according to Example 1, which may be also similarly confirmed in a qualitative evaluation result. In other words, Sr is not shown according to Comparative example 1, meanwhile, Sr is shown according to Example 1.

According to the measurement and detection results, it may be appreciated that Sr is not substituted with a constitutive element, but is doped on the interstitial spaces, maintaining a crystal structure, according to Example 1.

TABLE 1

| Classification | Al(z) | Eu(a) | Sr(b) |
|---|---|---|---|
| Comparative Example 1 | 0.2 | 0.0152 | None |
| Example 1 | 0.2 | 0.0152 | 1 mol % |
| Example 2 | 0.2 | 0.0152 | 1.5 mol % |
| Example 3 | 0.2 | 0.0152 | 2 mol % |
| Example 4 | 0.2 | 0.0152 | 3 mol % |
| Example 5 | 0.2 | 0.0152 | 4 mol % |

Examples 2 to 5

Examples 2 to 5 were performed under equivalent conditions to Example 1, but so as to satisfy the composition rate of the above Table 1, a β-sialon phosphor to which each of Sr of 1.5 mol %, 2 mol %, 3 mol % and 4 mol % were added was manufactured.

For the β-sialon phosphors according to Examples 1 to 5 and the β-sialon phosphors according to Comparative example 1, a luminance level was measured together with a light emitting spectrum as a peak wavelength and a full width of a half maximum (FWHM) from an excitation light source of 460 nm and a color coordinate.

TABLE 2

| | Color Coordinate | | Peak Wavelength | Full width of a half maximum | Luminance |
|---|---|---|---|---|---|
| Classification | x | y | (nm) | (FWHM) | (%) |
| Comparative Example 1 | 0.3385 | 0.6352 | 540.6 | 51.0 | 100 |
| Example 1 | 0.3344 | 0.6372 | 540.0 | 52.5 | 121.6 |
| Example 2 | 0.3324 | 0.6398 | 539.5 | 52.0 | 123.5 |
| Example 3 | 0.3273 | 0.6398 | 539.0 | 52.2 | 119.6 |

Figure 5:
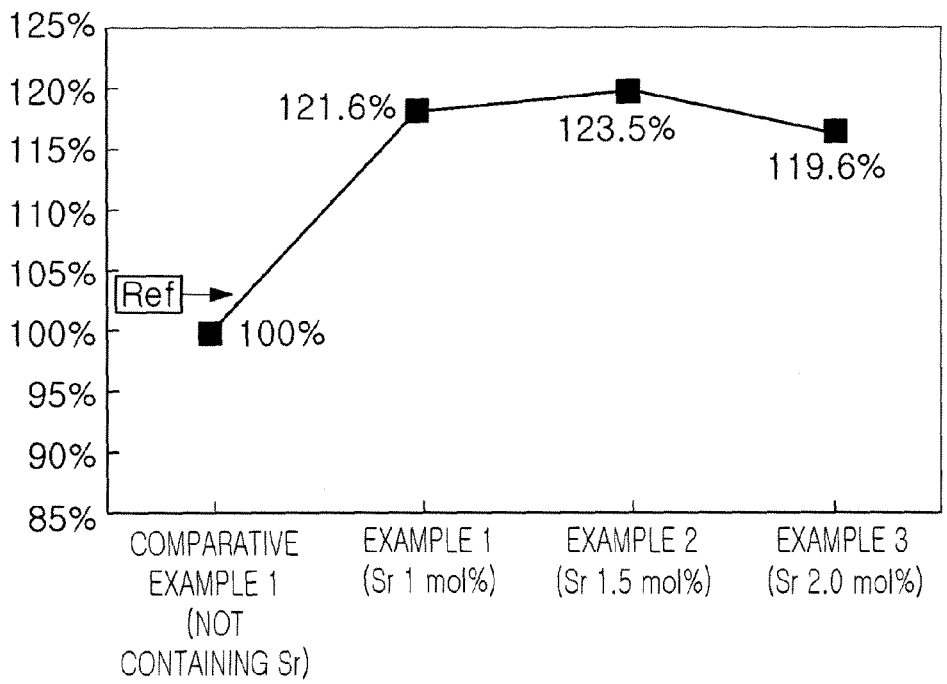
FIG. 5 is a graph showing a luminance improvement effect in a β-sialon phosphor according to Examples 1 to 4 of the present invention.

On the basis of comparative example 1 (luminance of 100%) to which Sr was not added, the luminance measurement results were represented as luminance according to Examples 1 to 5 in graph of FIG. 5 and Table 2. As shown in FIG. 5, it may be appreciated that the β-sialon phosphor according to Examples 1 to 3 has been improved by 20% or more in relative luminance as compared to the β-sialon phosphor according to Comparative Example 1 to which Sr was not added. Meanwhile, for example, when the amount of Sr was 3 mol % or 4 mol % according to Examples 4 and 5, it was confirmed that the increase in luminance was 111.2% and 105% respectively, and thus, the increased rate thereof slightly became reduced.

Therefore, in terms of luminance improvement and efficiency improvement, the amount of Sr may be determined as ranging from 0.1 to 5 mol %, and may preferably range from 0.5 to 3 mol % or range from 1 to 1.5 mol % as being proposed according to Examples 1 to 3.

Figure 7:
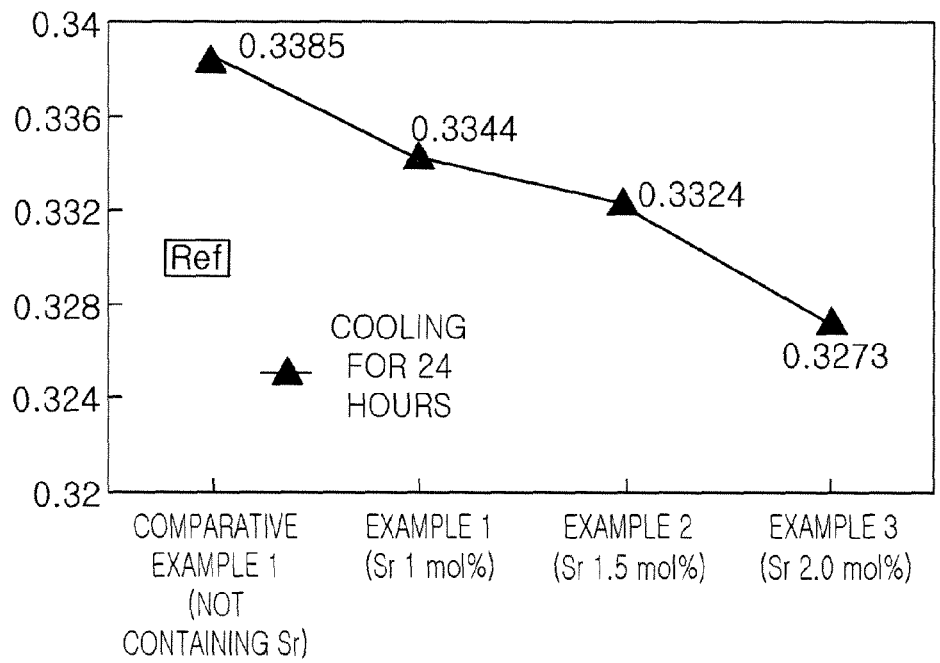
FIG. 7 is a graph showing a short wavelength effect in a β-sialon phosphor according to Examples 1 to 4 of the present invention.

Meanwhile, the color coordinates for the β-sialon phosphor according to Examples 1 to 5 had remarkably distinguished characteristics as compared to that of Comparative Example 1. That is, as shown in the above Table 2, a value of x in the color coordinates according to Examples 1 to 5 was lower than a value of x in the β-sialon phosphor according to Comparative Example 1 with regard to a short wavelength thereof, while a value of y therefor tended to increase. Related to that, in the case of a peak wavelength, it was confirmed that all values in Examples 1 to 5 had a short wavelength of 540 nm or below. In particular, this tendency may be in relation to the increase in the amount of Sr as shown in FIG. 7.

Figure 6:
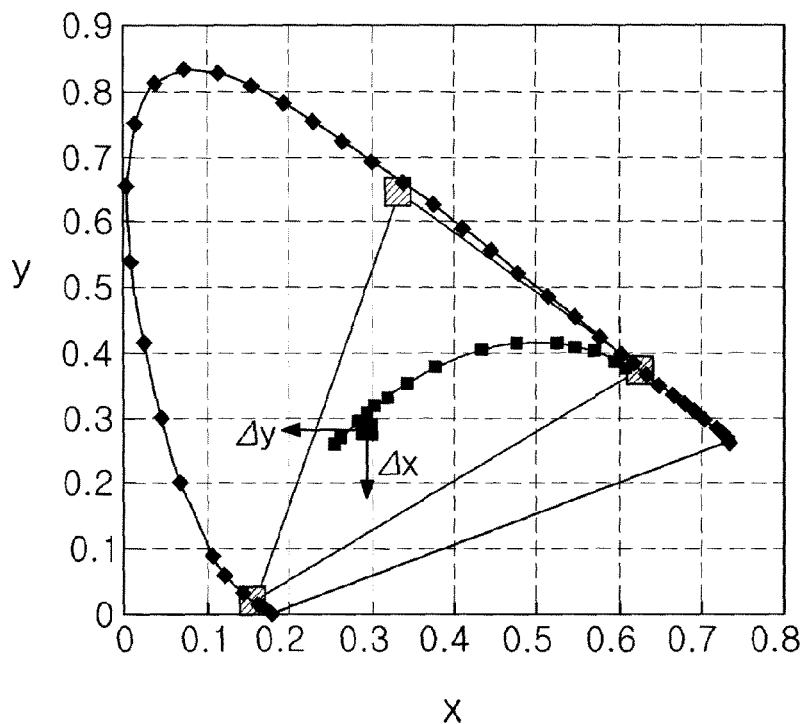
FIG. 6 is a CIE 1931 color coordinate system for explaining regarding a color coordinate of light emitted from a phosphor and characteristics of over time thereof.

The color coordinates provided according to Examples 1 to 5 may satisfy a green light emitting condition of sRGB at a relatively high level. In other words, in the CIE 1931 color coordinate system of FIG. 6, when x is relatively low and y is relatively high in the green light emitting coordinate thereof, it may be regarded as being more appropriable thereto. It was confirmed that since x was 0.336 or below and y was 0.637 or more in the light emitting color coordinate of the 13-sialon phosphor according to Examples 1 to 5, the Examples 1 to 5 were more appropriable as compared to Comparative Example 1.

Figure 8:
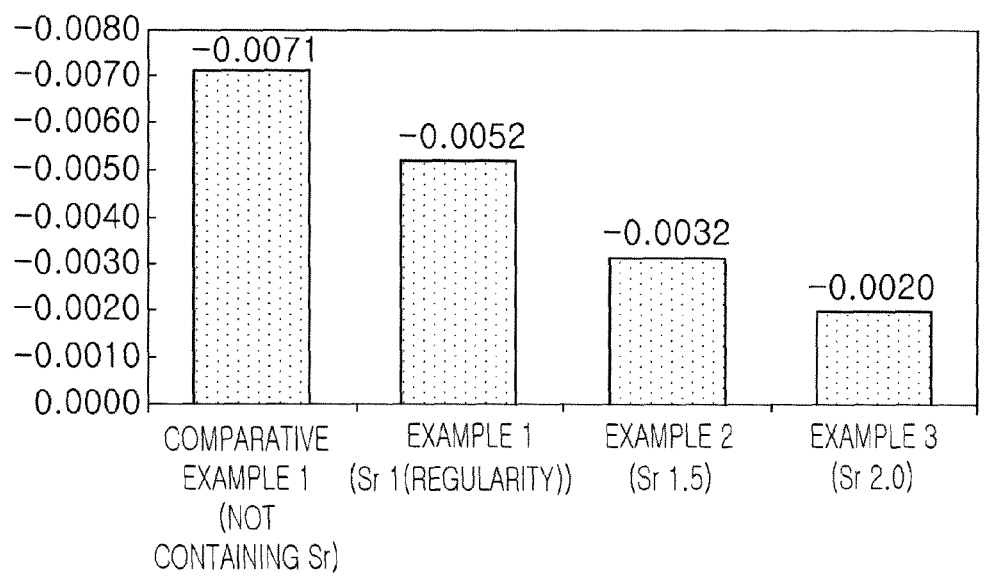
FIG. 8 is a graph showing an overtime characteristic improvement effect (reduction in an amount of change of y color coordinate) in a β-sialon phosphor according to Examples 1 to 4 of the present invention.

Further, since phase stabilization due to the addition of Sr may be enhanced by the β-sialon phosphor according to Examples 1 to 5, a change in conversion efficiency over time can be significantly reduced. In particular, this change in efficiency may be compared and determined by a change in a y color coordinates. FIG. 8 is a graph showing an amount of change of y as an overtime characteristic improvement effect according to Examples 1 to 3 with Comparative Example 1.

Among various methods of measuring an amount of change of y, in a method according to the present Example, the phosphor was applied to a blue light emitting diode of 460 nm and started to be driven at 3.3 V and 120 mA to emit light, and at this time, a value of y in the CIE 1931 chromaticity coordinate measured from the emission light was indicated as y1, and a value of y in the CIE 1931 chromaticity coordinate measured from light emitted after the above driving condition lasted at 85° C. for 24 hours was indicated as y2; it was defined as y2−y1.

As a result, in the case of Comparative Example 1, it was represented relatively highly as −0.0071, but in the case of Examples 1 to 3 according to the present invention, the amount of change of y in the CIE 1931 chromaticity coordinates of light emitted from the phosphor might be −0.0065 or below. It was confirmed that when the amount of Sr became increased, the overtime characteristic became stabilized.

Hereinafter, in order to confirm whether or not there is an effect when adding other components in addition to Sr, the following Comparative Examples 2 to 5 and Examples 6 and 7 were carried out.

Comparative Examples 2 to 4

In Comparative Examples 2 to 4, with the exception of using $CaCO_3$ as a Ca-containing compound in place of using $SrCO_3$, a β-sialon phosphor containing each of Ca of 0.5 mol %, 1.0 mol % and 1.5 mol % was manufactured under the same conditions and processes as Example 1 such that a composition rate according to Comparative Examples 2 to 4 in the above Table 3 was satisfied.

Comparative Example 5

In Comparative Example 5, with the exception of using MgCO₃ as a Ba-containing compound in place of using SrCO₃, a β-sialon phosphor containing Mg of 1.0 mol was manufactured under the same conditions and processes as Example 1 such that a composition rate according to Comparative Example 5 in the above Table 3 was satisfied.

Example 6

In the case of the present Example 6, with the exception of using BaCO₃ as a Ba-containing compound in addition to SrCO₃, a β-sialon phosphor containing Sr and Ba of 0.5 mol % respectively was manufactured under the same conditions and processes as Example 1 such that a composition rate according to Comparative Example 6 in the above Table 3 was satisfied.

Example 7

In the case of the present Example 7, with the exception of additionally using BaCO₃ as a Ba-containing compound in place of SrCO₃, a β-sialon phosphor containing Ba of 1.0 mol % was manufactured under the same conditions and processes as Example 1 such that a composition rate according to Comparative Example 7 in the above Table 3 was satisfied.

TABLE 3

| Classification | Al(z) | Eu(a) | Additional Dopant Kind | Additional Dopant Amount (mol %) |
|---|---|---|---|---|
| Comparative Example 1 | 0.2 | 0.0152 | None | None |
| Comparative Example 2 | 0.2 | 0.0152 | Ca | 0.5 |
| Comparative Example 3 | 0.2 | 0.0152 | Ca | 1.0 |
| Comparative Example 4 | 0.2 | 0.0152 | Ca | 1.5 |
| Comparative Example 5 | 0.2 | 0.0152 | Mg | 1.0 |
| Example 6 | 0.2 | 0.0152 | Sr, Ba | 0.5, 0.5 |
| Example 7 | 0.2 | 0.0152 | Ba | 1.0 |

With respect to the β-sialon phosphor according to Examples 6 and 7 and the β-sialon phosphor according to Comparative Examples 2 to 5, a luminance level was measured together with a light emitting spectrum as a peak wavelength and a full width of a half maximum (FWHM) from an excitation light source of 460 nm and a color coordinate, and the results thereof were represented in the following Table 4.

TABLE 4

| Classification | Color Coordinate x | Color Coordinate y | Peak Wavelength (nm) | Full width of a half maximum (FWHM) | Luminance (%) |
|---|---|---|---|---|---|
| Comparative example 1 | 0.3385 | 0.6352 | 540.6 | 51.0 | 100 |
| Comparative example 2 | 0.3457 | 0.6272 | 541.5 | 55.4 | 75 |
| Comparative example 3 | 0.369 | 0.6052 | 541.5 | 61 | 54 |
| Comparative example 4 | 0.4132 | 0.5644 | 542.6 | 89 | 44 |
| Comparative example 5 | 0.3375 | 0.6356 | 540 | 52.7 | 90 |
| Example 6 | 0.3328 | 0.6378 | 540 | 51.5 | 113.4 |
| Example 7 | 0.3334 | 0.6375 | 540 | 51.5 | 116.3 |

Figure 9:
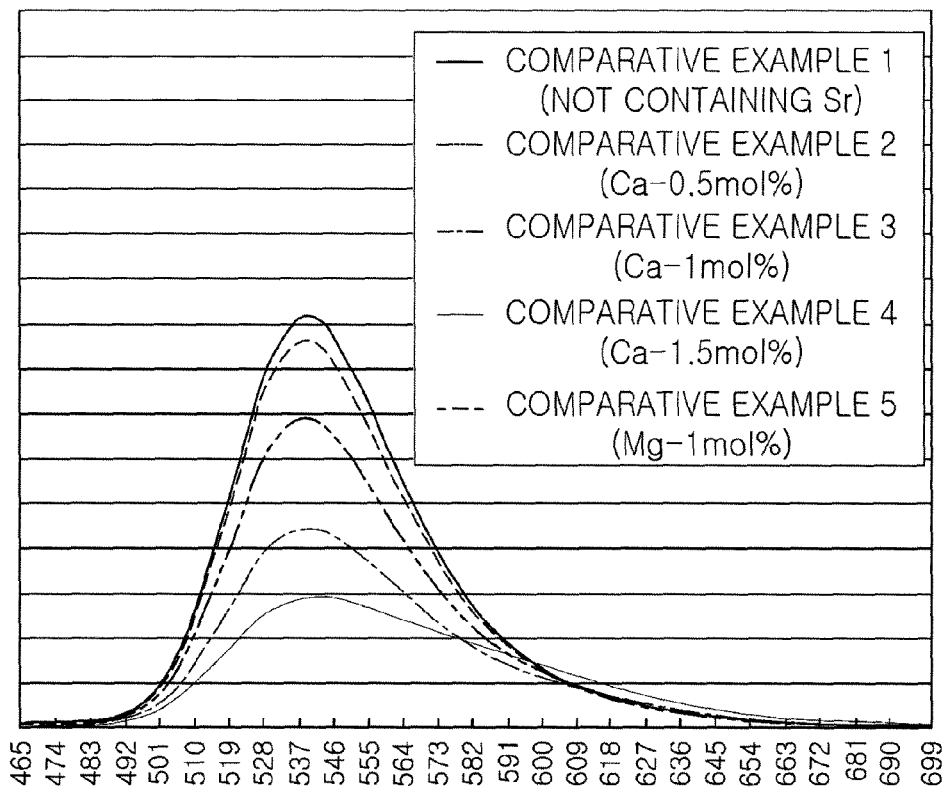
FIG. 9 is a graph of an emission spectrum of a β-sialon phosphor according to Comparative Examples 1 to 4.

First, with respect to the luminance measurement results referring to the above Table 4, in the case of Comparative Examples 2 to 5 in which Ca and Mg were respectively added in the place of Sr, it was seen that all luminance values were reduced on the basis of Comparative Example 1 (luminance of 100%) (Please refer to FIG. 9). In addition, in the CIE 1913 color coordinates, a value of x rather became high as a long wavelength, and a value of y became lowered, which tended to be unbeneficial.

Figure 10:
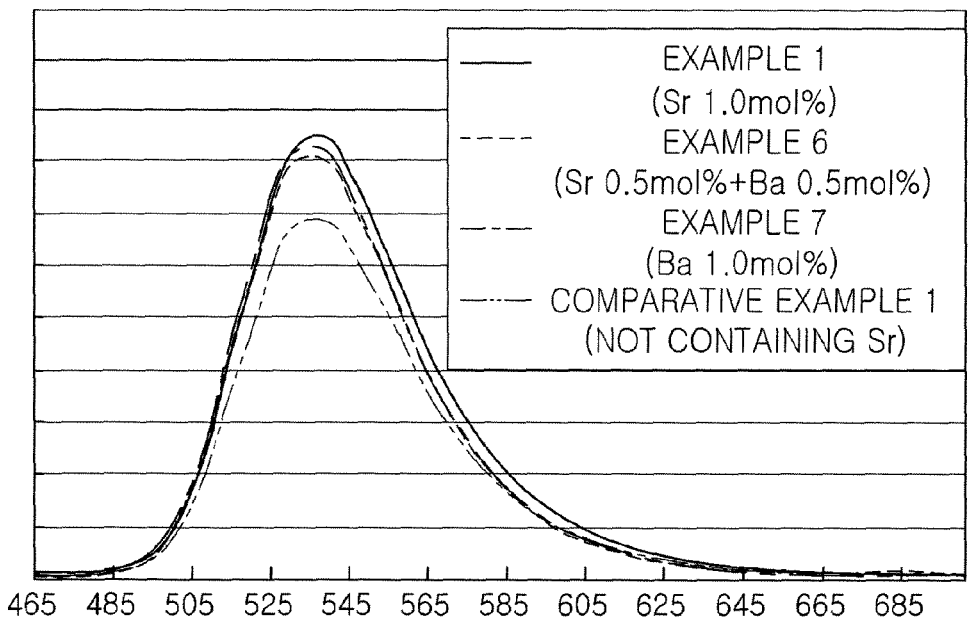
FIG. 10 is a graph of an emission spectrum of a β-sialon phosphor according to Examples 1, 6 and 7 of the present invention.

However, in the case of the β-sialon phosphor according to Examples 6 and 7 in the similar manner to the case in which only Sr was added, luminance was improved 13.4% and 16.30 respectively (please refer to FIG. 10). In addition, in the CIE 1913 color coordinates, a value of x became lowered as a short wavelength, and a value of y became high, in the similar manner to the afore-mentioned Examples.

As such, in terms of not only luminance but also the color coordinates, it was confirmed that in the case of Ca and Mg it was not appropriate to use as an activator for replacing Sr, meanwhile in the case of using Sr and Ba together or using only Ba instead of Sr, an effect similar thereto was expected.

Hereinafter, the following Examples 8 to 13 and Comparative Examples 5 and 6 were carried out in order to confirm the conditions with regard to Al composition rate (z).

Examples 8 to 13

In the present Examples, AlN and Al₂O₃ were weighed such that an Al composition rate (z) becomes respective 0.1, 0.2, 0.3, 0.4, 0.5 and 1.0 mol % (in respective Examples 8 to 13) in a final phosphor, and then, a β-sialon phosphor was manufactured under the same conditions and processes as Example 1 except mixing with the primary raw mixture together.

Comparative Examples 5 and 6

In the present Comparative Examples, AlN and Al₂O₃ were weighed such that Al composition rates (z) became 1.5 and 2.0 mol % respectively (in respective Examples 5 and 6) in a final phosphor, and then, a β-sialon phosphor was manufactured under the same conditions and processes as Example 1, except mixing with the primary raw mixture together.

Figure 11:
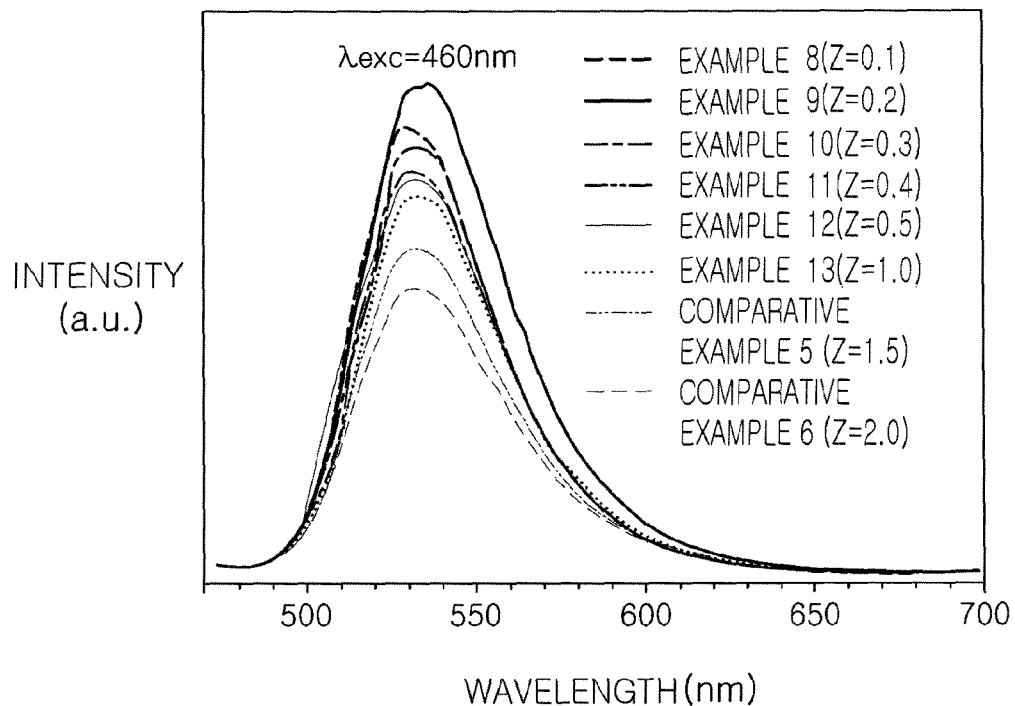
FIG. 11 is a graph of an emission spectrum of a β-sialon phosphor according to Examples 8 to 13 of the present invention and Comparative Examples 5 and 6.

The β-sialon phosphor according to Examples 8 to 13 and the β-sialon phosphor according to Comparative Examples 5 and 6 were excited by a light source of 460 nm and a light emitting spectrum was measured, from which the results were shown in FIG. 11. Further, FIG. 12 shows an intensity integral calculus value and a peak intensity regarding respective Examples and Comparative Examples.

Figure 12:
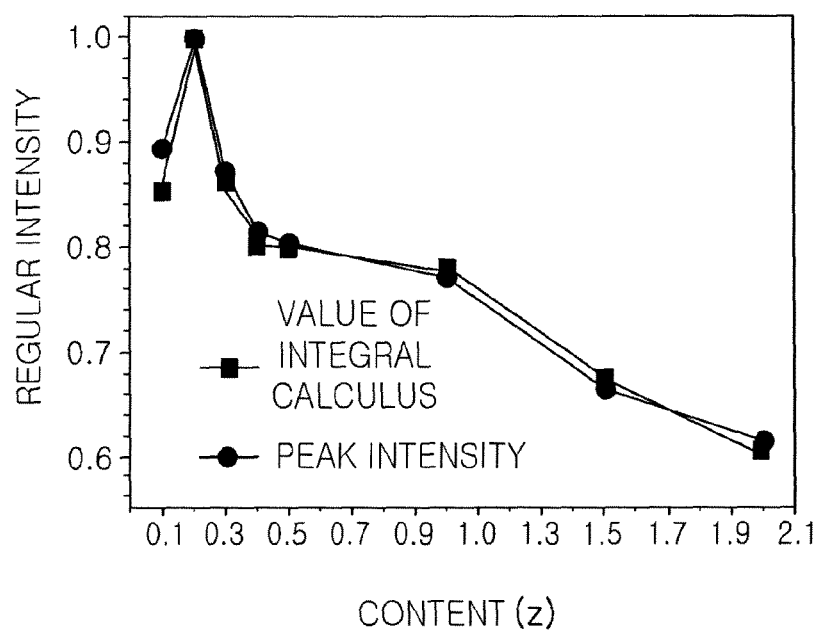
FIG. 12 is a graph showing intensity integral calculus value and peak intensity in a β-sialon phosphor according to Examples 8 to 13 of the present invention and Comparative Examples 5 and 6.

With reference to FIGS. 11 and 12, in the case of Examples 8 to 13 with the Al composition rate (z) of 1 mol % or below, a regularized strength was represented as about 0.8 or more relatively highly, while the luminance was slightly deteriorated in Comparative Examples 5 and 6 in which the Al composition rates (z) are 1.5 mol % and 2.0 mol %.

According to the above results, a composition rate (z) of Al may be determined to range from 0.01 to 1.0 mol %, and may preferably range from 0.1 to 0.3 mol %, and a highest peak was represented at 0.23 mol %.

Figure 13:
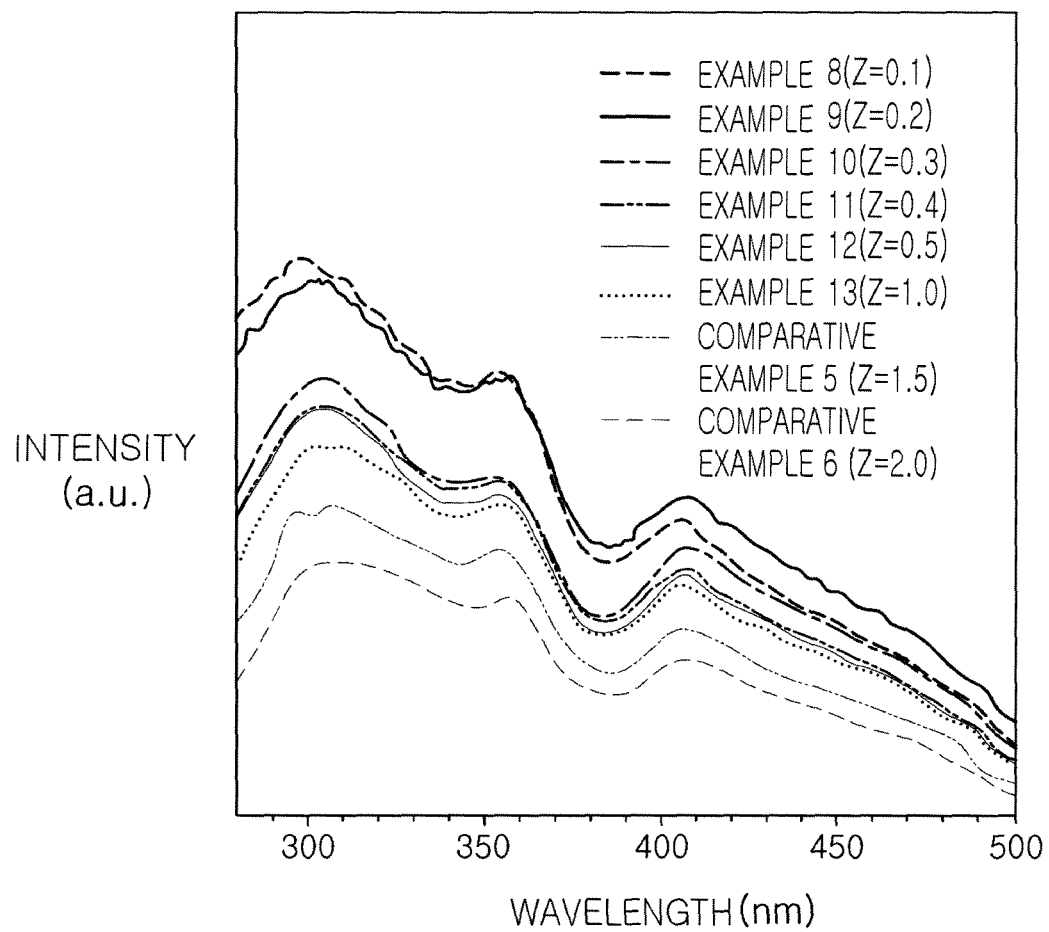
FIG. 13 is a graph showing an excitation spectrum of a β-sialon phosphor according to Examples 8 to 13 of the present invention and Comparative Examples 5 and 6.

FIG. 13 shows an excitation spectrum of a β-sialon phosphor according to the Examples 8 to 13 and the Comparative Examples 5 and 6. As shown in FIG. 13, it resulted in that relatively high conversion efficiency was expected in an ultraviolet band rather than in a blue band of 430 to 470 nm. Therefore, the phosphor according to the present Examples may be useful to devices using ultraviolet rays as an excitation light source.

The following Examples 14 to 24 were carried out to confirm the conditions regarding an amount (mol %) of Eu.

Examples 14 to 23

In the present Examples, $Eu_2O_3$ was weighed such that a mol % rate (a) of Eu becomes 0.65, 0.98, 1.30, 1.52, 1.73, 1.95, 2.17, 2.38, 2.60 and 3.90 mol % respectively (in respective Examples 14 to 23) in a final phosphor, and then, a β-sialon phosphor was manufactured under the same conditions and processes as Example 1 except mixing with the primary raw mixture together.

Figure 14:
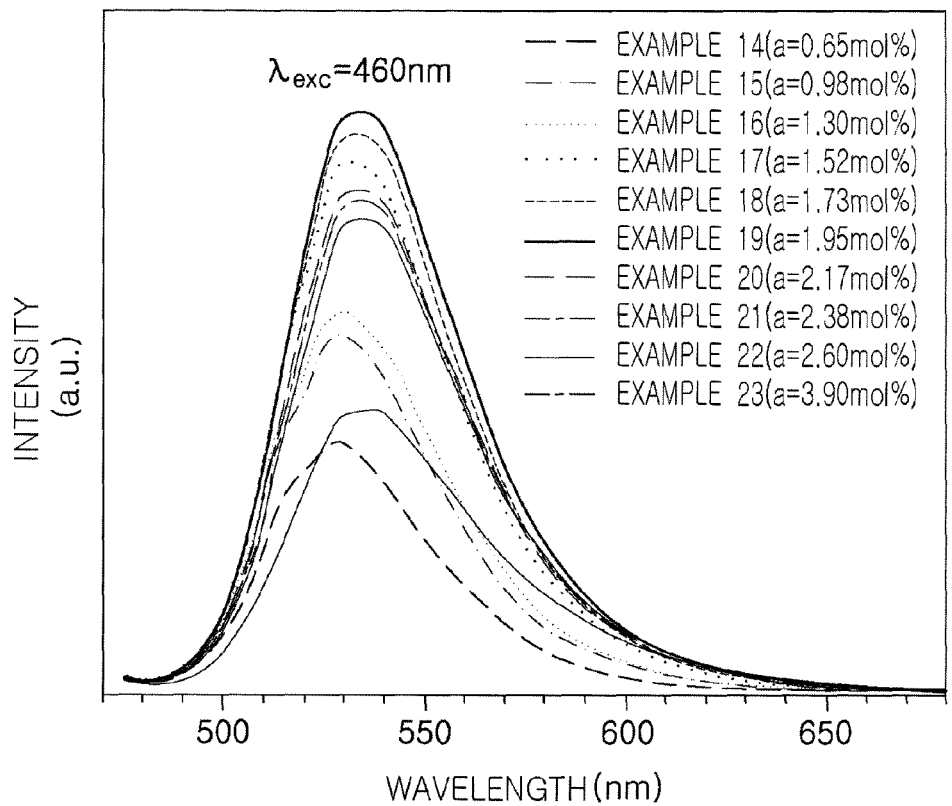
FIG. 14 is a graph showing an emission spectrum of a β-sialon phosphor according to Examples 14 to 23 of the present invention.
Figure 15:
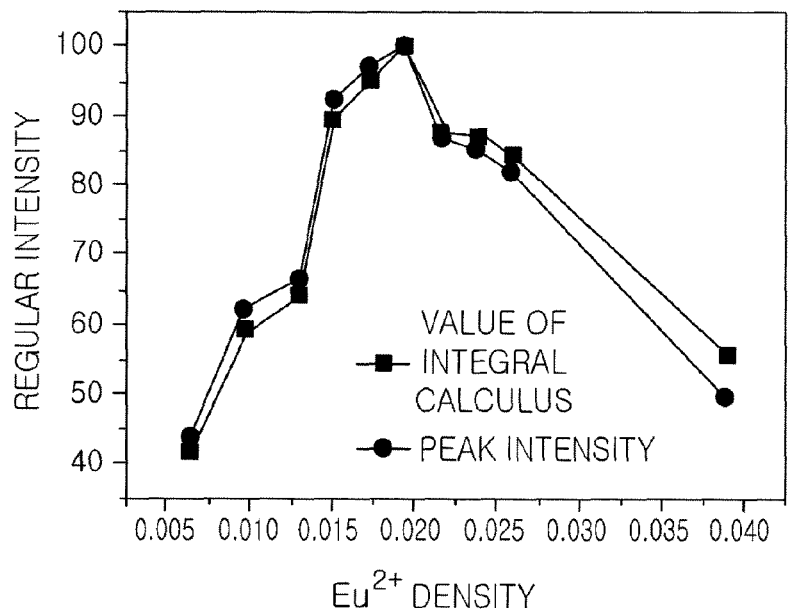
FIG. 15 is a graph showing an intensity integral calculus value and peak intensity in a β-sialon phosphor according to Examples 14 to 23 of the present invention.
Figure 17:
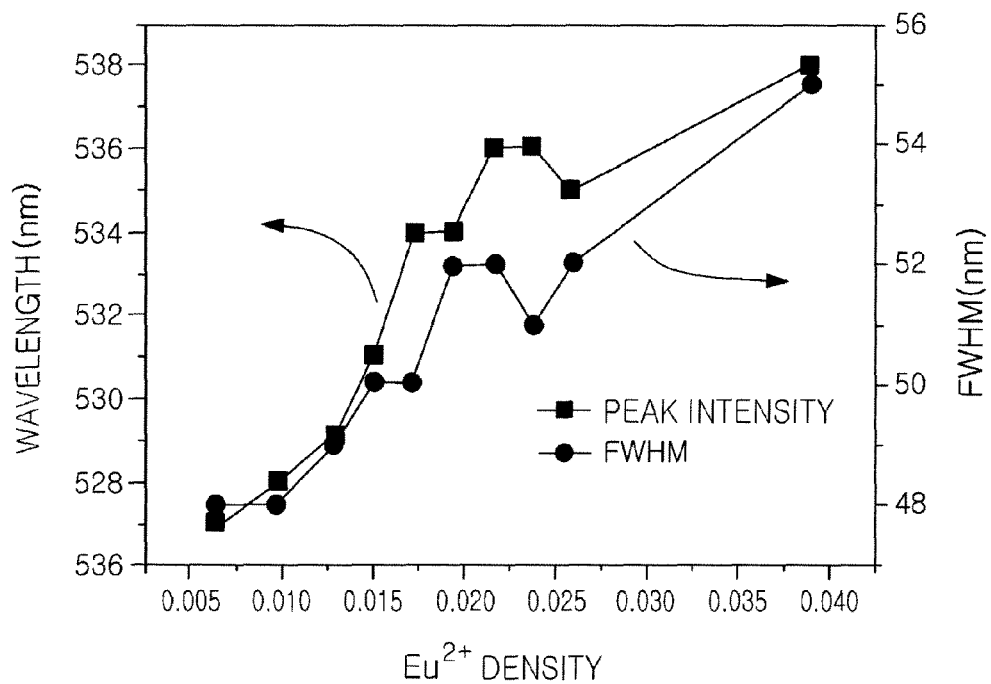
FIG. 17 is a graph showing peak intensity and a full width of a half maximum (FWHM) in a β-sialon phosphor according to Examples 14 to 23 of the present invention.

The β-sialon phosphor according to Examples 14 to 23 was excited by a light source of 460 nm and a light emitting spectrum was measured, from which the results were shown in FIG. 14. Further, FIG. 15 shows an intensity integral calculus value and a peak intensity regarding respective Examples and Comparative Examples. An amount (a) of Eu may be determined to range from 0.1 to 5 mol %, and may preferably range from 0.9 to 3 mol in consideration of a full width of a half maximum (FWHM) (please refer to FIG. 17) together with luminance.

Figure 16:
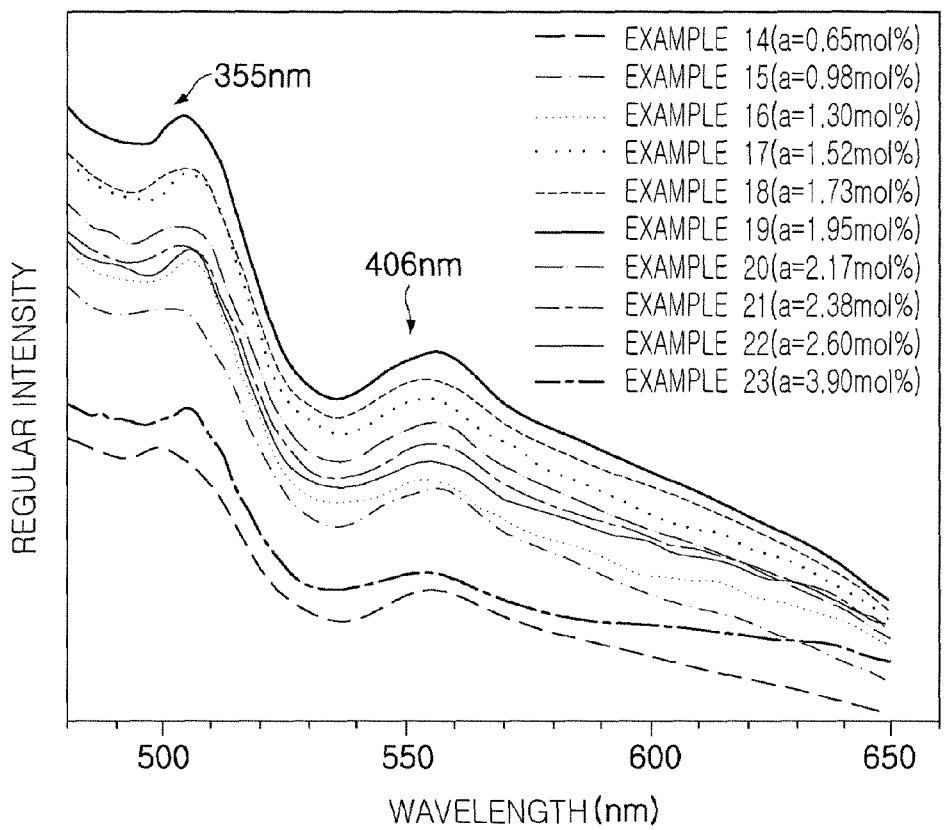
FIG. 16 is a graph showing an excitation spectrum of a β-sialon phosphor according to Examples 14 to 23 of the present invention.

FIG. 16 shows an excitation spectrum of a β-sialon phosphor according to Examples 8 to 13 and Comparative Examples 5 and 6. As shown in FIG. 13, it resulted in that relatively high conversion efficiency was expected in an ultraviolet band (in particular, of 355 nm) rather than in a blue band and a near ultraviolet band (in particular, of 406 nm). Therefore, the phosphor according to the present Examples may also be useful to illuminators or display devices in which ultraviolet rays are used as an excitation light source.

As such, the β-sialon phosphor according to the Examples of the present invention may be applied to a light emitting device and various illumination apparatuses and display apparatuses. According to this application form, the phosphor may be used by being mixed with a transparent resin such as a silicon resin. In the case of being mixed with the transparent resin, precipitation may occur in phosphor powder, for example, in a state in which the phosphor is accommodated in a syringe prior to the packaging or prior to the hardening after the packaging process, an irregular distribution in the phosphor may occur due to the precipitation therein and a color coordinate distribution may be increased according to the packaging.

In order to reduce this irregular color distribution, an extent of precipitation should be uniform and the size of phosphor powder should be uniform, which may be appropriately controlled through the grain size, among several factors therefor.

A grain size distribution in a β-sialon phosphor according to various embodiments of the present invention may be also appropriately controlled through a crushing process and a classification process. A grain size distribution in the β-sialon phosphor according to the embodiment of the present invention is shown in a graph of FIG. 18. As a grain size condition, a value D50 may range from 14.5 to 18.5 μm and may preferably range from 14 to 18 μm. In addition, a value D10 may range from 8 to 11 μm, and a value D90 may range from 23 to 25 μm.

Various applications including the phosphor according to an embodiment of the present invention will now be described with reference to the accompanying drawings.

Figure 19:
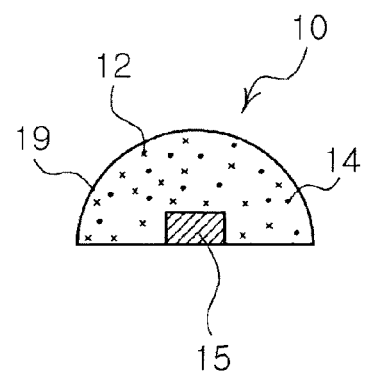
FIG. 19 is a schematic cross-sectional view of a white light emitting device according to an embodiment of the present invention.

FIG. 19 is a schematic view of a white light emitting device according to an embodiment of the present invention.

As shown in FIG. 19, a white light emitting device 10 according to the embodiment of the present invention may include a blue LED chip 15 and a resin packaging part 19 packaging the blue LED chip 15 and having an upwardly convex lens shape.

The resin packaging part 19 according to the present embodiment is illustrated as having a hemispherical lens shape to secure a large orientation angle. The blue LED chip 15 may be directly mounted on a circuit board. The resin packaging part 19 may be formed of a silicon resin, an epoxy resin, or a combination thereof. A green phosphor 12 and a red phosphor 14 may be dispersed in the interior of the resin packaging part 19.

As the green phosphor 12 employed according to the present embodiment, an oxynitride phosphor expressed by an empirical formula $M_xA_yO_xN_{(4/3)y}$, or an oxynitride phosphor expressed by an empirical formula $M_aA_bO_c N_{((2/3)a+(4/3)b-(2/3)c)}$, may be used in addition to the above-described β-sialon phosphor. Here, M is at least one of a group II element selected from a group consisting of beryllium (Be), magnesium (Mg), calcium (Ca), strontium (Sr), and zinc (Zn), and A is at least one of a group IV element selected from a group consisting of carbon (C), silicon (Si), germanium (Ge), tin (Sn), titanium (Ti), zirconium (Zr), and hafnium (Hf).

Meanwhile, the red phosphor 14 which can be employed in the present embodiment may be at least one selected from among a nitride-based phosphor of $M1AlSiN_x$:Re(1≤x≤5), a sulfide-based phosphor of M1D:Re, and a silicate-based phosphor of $(Sr,L)_2SiO_{4-x}N_y$:Eu (Here, 0<x<4, y=2x/3). Here, M1 is at least one element selected from barium (Ba), strontium (Sr), calcium (Ca) and magnesium (Mg), D is at least one element selected from sulfur (S), selenium (Se), and tellurium (Te), L is at least one group II element selected from a group consisting of barium (Ba), calcium (Ca) and magnesium (Mg), or at least one group I element selected from a group consisting of lithium (Li), sodium (Na), potassium (K), rubidium (Rb), and cesium (Cs), D is at least one selected from sulfur (S), selenium (Se) and tellurium (Te), and Re is at least one selected from among yttrium (Y), lanthanum (La), cerium (Ce), neodymium (Nd), promethium (Pm), samarium (Sm), gadolinium (Gd), terbium (Tb), dysprosium (Dy), holmium (Ho), erbium (Er), thulium (Tm), ytterbium (Yb), lutetium (Lu), F, chlorine (Cl), bromine (Br), and iodine (I).

In this manner, since a particular green phosphor and a particular red phosphor are provided in the form of a combination in consideration of the full width of a half maximum (FWHM), the peak wavelength, and/or the conversion efficiency, or the like, white light having a high color rendering index of 70 or higher can be provided. Also, because light of various wavelength bands is obtained through a plurality of phosphors, color reproducibility (or color gamut) may be improved.

In the case of the silicate-based red phosphor of $(Sr,L)_2SiO_{4-x}N_y$:Eu, among the red phosphors, preferably, the range of x may be 0.15≤x≤3. In the empirical formula, a portion of silicon (Si) may be substituted with a different element. For example, it may be substituted with at least one element selected from a group consisting of boron (B), aluminum (Al), gallium (Ga), and indium (In). Alternatively, it may be substituted with at least one element selected from a group consisting of titanium (Ti), zirconium (Zr), Gf, tin (Sn), and lead (Pb).

A main wavelength of the blue LED chip may range from 430 nm to 470 nm. In this case, in order to improve the color rendering index by securing a wider spectrum in the visible spectrum band, the light emission wavelength peak of the green phosphor 12 may range from 500 nm to 550 nm and that of the red phosphor 14 may range from 600 nm to 660 nm.

The blue LED chip may have a full width of a half maximum (FWHM) ranging from 10 nm to 50 nm, the green phosphor may have a full width of a half maximum (FWHM) ranging from 30 nm to 200 nm, and the red phosphor may have a full width of a half maximum (FWHM) ranging from 50 nm to 250 nm.

In another embodiment of the present invention, a yellow phosphor or a yellowish-orange phosphor may be included in addition to the foregoing red phosphor 12 and the green phosphor 14. In this case, a more improved color rendering index may be obtained. This embodiment is illustrated in FIG. 20.

Figure 20:
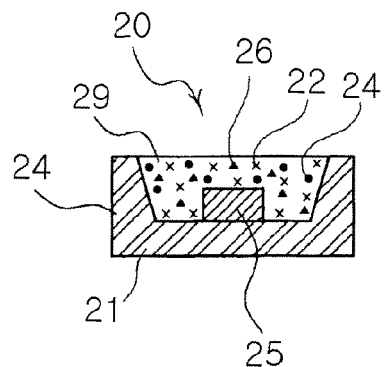
FIG. 20 is a schematic cross-sectional view of a white light emitting device according to another embodiment of the present invention.

With reference to FIG. 20, a white light emitting device 20 according to the present embodiment may include a package main body 21 having a reflective cup formed at a center thereof, a blue LED chip 25 mounted on the bottom of the reflective cup, and a transparent resin packaging part 29 encapsulating the blue LED chip 25 within the reflective cup.

The resin packaging part 29 may be formed of, for example, a silicon resin, an epoxy resin, or a combination thereof. In the present embodiment, the resin packaging part 29 may include a green phosphor 22 and a red phosphor 24 of the forgoing embodiments, and an additional yellow or yellowish-orange phosphor 26.

Namely, the green phosphor 22 may include an $M_x A_y O_x N_{(4/3)y}$ oxynitride phosphor or an $M_a A_b O_c N_{((2/3)a+(4/3)b-(2/3)c)}$ oxynitride phosphor in addition to the foregoing β-sialon phosphor. The red phosphor 24 may be at least one selected from among a nitride-based phosphor of M1AlSiN$_x$:Re (1≤x≤5) and a sulfide-based phosphor of M1D:Re.

Also, in the present embodiment, the third phosphor 26 may be further included. The third phosphor may be a yellow or a yellowish-orange phosphor which can emit light from a wavelength band positioned in the middle of the green and red wavelength bands. The yellow or yellowish-orange phosphor may be a silicate-based phosphor. The yellowish-orange phosphor may be a α-SiAlON:Re-based or a garnet-based phosphor of YAG and TAG.

In the foregoing embodiment, the case in which two or more types of phosphor powders are mixed to be dispersed in a single resin packaging part area is illustrated, but various other structures may be implemented. In detail, the two or three types of phosphors may be formed to have a structure in which they form different layers. For example, the green phosphor, the red phosphor, and the yellow or yellowish-orange phosphor may be provided as phosphor layers in a multilayered structure by dispersing the corresponding types of phosphor powder at a high pressure.

Figure 21:
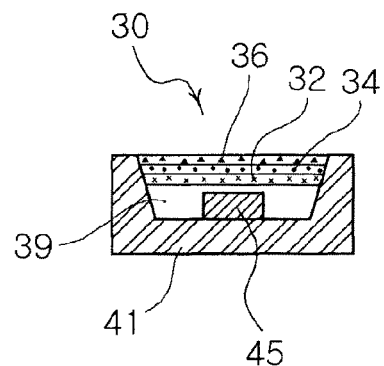
FIG. 21 is a schematic cross-sectional view of a white light emitting device according to another embodiment of the present invention.

Alternatively, as shown in FIG. 21, a plurality of phosphor-containing resin layer structures may be implemented. With reference to FIG. 21, as in the former embodiment, a white light emitting device 30 according to the present embodiment may include a package main body 31 having a reflective cup formed at the center thereof, a blue LED 35 mounted on the bottom of the reflective cup, and a transparent resin packaging part 39 encapsulating the red LED 35 within the reflective cup.

A resin layer including different phosphors layers may be provided on the resin packaging part 39. Namely, a wavelength conversion unit may be configured to include a first resin layer 32 containing the green phosphor, a second resin layer 34 containing the red phosphor, and a third resin layer 36 containing the yellow or yellowish-orange phosphor.

The phosphor used according to the present embodiment may be the same as or similar to the phosphor described in the foregoing embodiments.

White light obtained by combining the phosphors proposed in the embodiment of the present invention may obtain a high color rendering index. Namely, when the yellow phosphor is combined with the blue LED chip, converted yellow light may be obtained together with blue wavelength light. In this case, since there is only a little light from the green and red wavelength bands in the overall visible spectrum, it is difficult to obtain a color rendering index close to natural light. In particular, the converted yellow light has a narrow full width of a half maximum (FWHM) so as to obtain high conversion efficiency, further lowering the color rendering index. In addition, the characteristics of manifested white light may be easily changed according to the degree of single yellow conversion, failing to guarantee excellent color reproducibility.

In comparison, in the embodiment in which the blue LED chip and the green phosphor (G) and the red phosphor (R) are combined, because light is emitted in the green and red bands, compared with the existing example, a wider spectrum may be obtained from within the visible spectrum, resulting in a great improvement in the color rendering index. Additionally, the color rendering index may be further improved by including the yellow or yellowish-orange phosphor which provides the middle wavelength band between the green and red bands.

Figure 22:
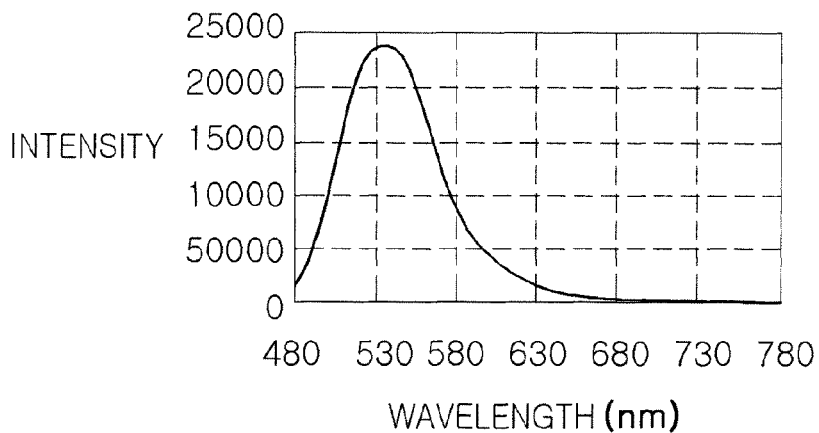
FIG. 22 is a graph showing a spectrum of a green phosphor according to an embodiment of the present invention.

FIG. 22 is a graph showing an emission spectrum of the green phosphor employed in an embodiment of the present invention. As shown in FIG. 22, the green phosphor obtained from the oxynitride phosphor according to an embodiment of the present invention may have a peak wavelength of approximately 540 nm and an emission spectrum having a full width of a half maximum (FWHM) of 76.7 nm.

Figure 23A:
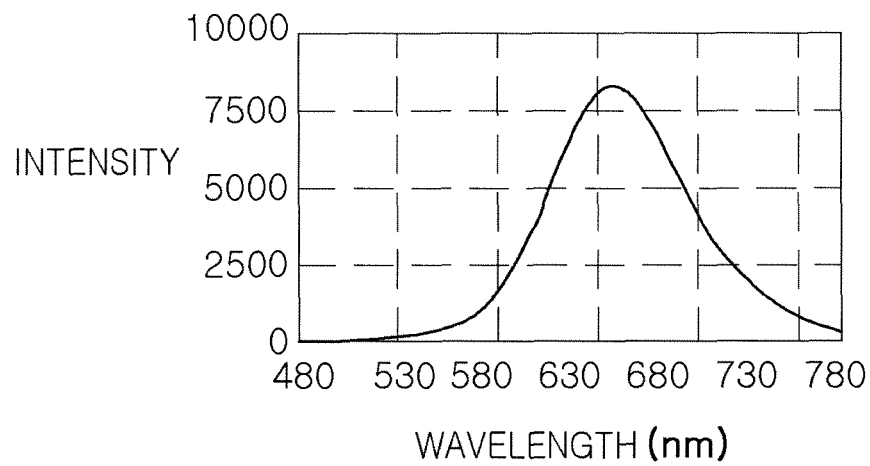
FIGS. 23A and 23B are graphs showing a spectrum of a red phosphor according to an embodiment of the present invention.
Figure 23B:
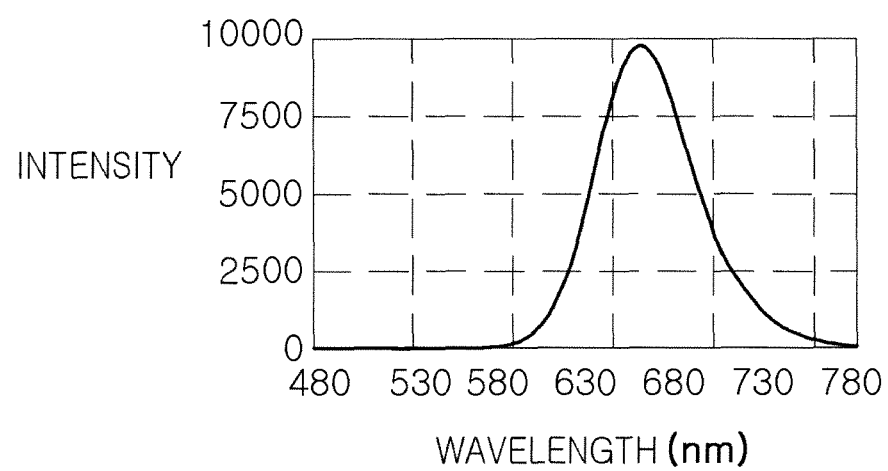

FIGS. 23A and 23B are graphs showing emission spectrums of the red phosphor which may be employed in an embodiment of the present invention.

With reference to FIG. 23a, the spectrum of a nitride-based phosphor of MAlSiN$_x$:Re (1≤x≤5) (Here, M is at least one element selected from among beryllium (Be), barium (Ba), strontium (Sr), calcium (Ca), and magnesium (Mg), and Re is at least one element selected from among yttrium (Y), lanthanum (La), cerium (Ce), neodymium (Nd), promethium (Pm), samarium (Sm), gadolinium (Gd), terbium (Tb), dysprosium (Dy), holmium (Ho), erbium (Er), thulium (Tm), ytterbium (Yb), lutetium (Lu), fluorine (F), chlorine (Cl), bromine (Br), and iodine (I)) is shown. The converted red light has a peak wavelength of approximately 640 nm, and a full width of a half maximum (FWHM) of approximately 85 nm.

With reference to FIG. 23b, the spectrum of a sulfide-based phosphor of MD:Eu,Re (Here, M is at least one element selected from among beryllium (Be), barium (Ba), strontium (Sr), calcium (Ca), and magnesium (Mg), D is at least one element selected from among sulfur (S), selenium (Se), and tellurium (Te), and Re is at least one element selected from among yttrium (Y), lanthanum (La), cerium (Ce), neodymium (Nd), promethium (Pm), samarium (Sm), gadolinium (Gd), terbium (Tb), dysprosium (Dy), holmium (Ho), erbium (Er), thulium (Tm), ytterbium (Yb), lutetium (Lu), F, chlorine (Cl), bromine (Br), and iodine (I)) is shown. The converted red light has a peak wavelength of approximately 655 nm, and a full width of a half maximum (FWHM) of approximately 55 nm.

Figure 24A:
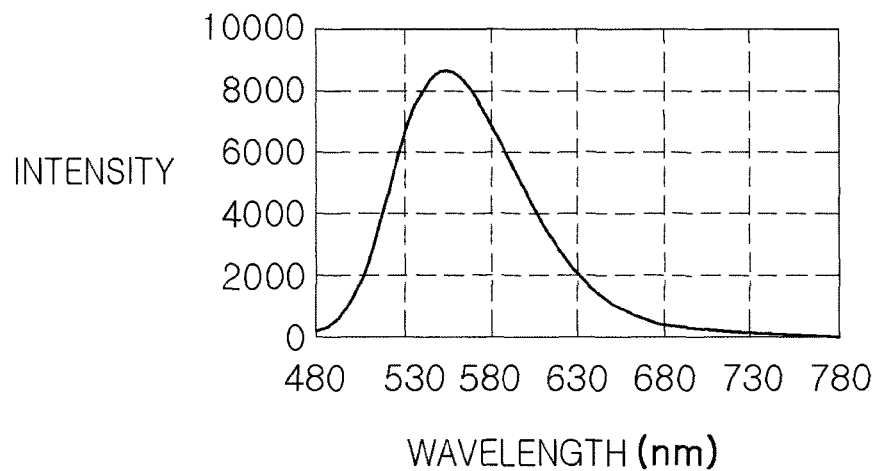
FIGS. 24A and 24B are graphs showing a spectrum of a yellow or yellowish orange phosphor according to an embodiment of the present invention.
Figure 24B:
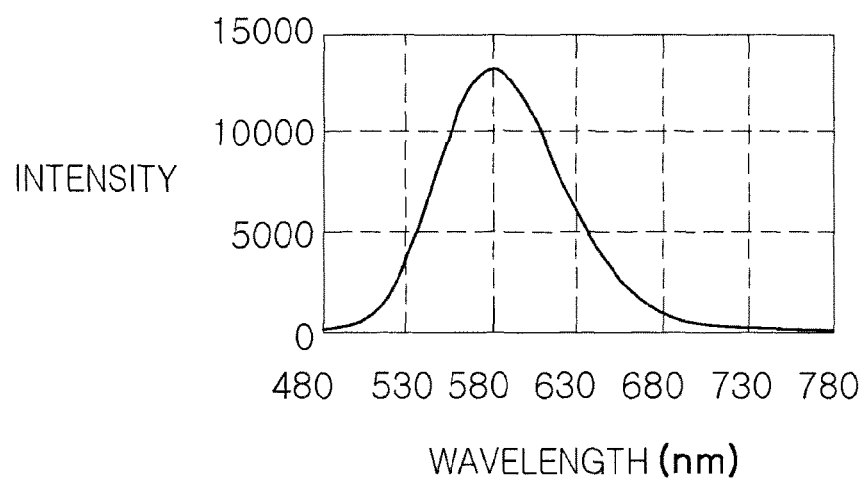

FIGS. 24A and 24B are graphs showing spectrums of the yellow or yellowish-orange phosphor which may be selectively employed in an embodiment of the present invention.

With reference to FIG. 24a, the spectrum of a silicate-based phosphor is shown. The converted yellow light has a peak wavelength of approximately 555 nm, and a full width of a half maximum (FWHM) of approximately 90 nm.

With reference to FIG. 24b, the spectrum of a α-SiAlON:Re phosphor (Here, Re is at least one element selected from among yttrium (Y), lanthanum (La), cerium (Ce), neodymium (Nd), promethium (Pm), samarium (Sm), gadolinium (Gd), terbium (Tb), dysprosium (Dy), holmium (Ho), erbium (Er), thulium (Tm), ytterbium (Yb), lutetium (Lu), F, chlorine (Cl), bromine (Br), and iodine (I), and Re is within the range of 1 ppm to 50000 ppm) is shown. The converted yellow light has a peak wavelength of approximately 580 nm and a full width of a half maximum (FWHM) of approximately 88 nm.

In this manner, since a particular green phosphor and a particular red phosphor are provided in the form of a combination in consideration of the full width of a half maximum (FWHM), the peak wavelength, and/or the conversion efficiency, etc., and a yellow or yellowish orange phosphor is added to the combination, white light having a high color rendering index of 70 or higher may be provided. In the CIE 1941 color coordinate system basis, as for color coordinates of the red light, x and y coordinates are within the range of $0.55 \leq x \leq 0.65$ and $0.25 \leq y \leq 0.35$, respectively, as for the color coordinates of the green light, x and y coordinates are within the range of $0.2 \leq x \leq 0.4$ and $0.5 \leq y \leq 0.7$, respectively, and as for the color coordinates of the blue light, x and y coordinates are within the range of $0.1 \leq x \leq 0.2$ and $0.02 \leq y \leq 0.15$, respectively.

When a main wavelength of the blue LED chip ranges from 430 nm to 470 nm, a light emission wavelength peak of the green phosphor may range from 500 nm to 550 nm, that of the red phosphor may range from 600 nm to 660 nm, and that of the yellow or yellowish-orange phosphor may range from 550 nm to 600 nm.

Also, when the blue LED chip has a full width of a half maximum (FWHM) ranging 10 nm to 50 nm, the green phosphor may have a full width of a half maximum (FWHM) ranging from 30 nm to 200 nm, and preferably, ranging from 60 nm to 80 nm, the red phosphor may have a full width of a half maximum (FWHM) ranging from 50 nm to 250 nm, and the yellow or yellowish-orange phosphor may have a full width of a half maximum (FWHM) ranging from 20 nm to 100 nm.

Through the selection and combination of the respective phosphors under such conditions, in an embodiment of the present invention, a relatively wide spectrum may be secured in the visible spectrum band, and excellent white light having a relatively larger color rendering index may be provided.

Figure 25:
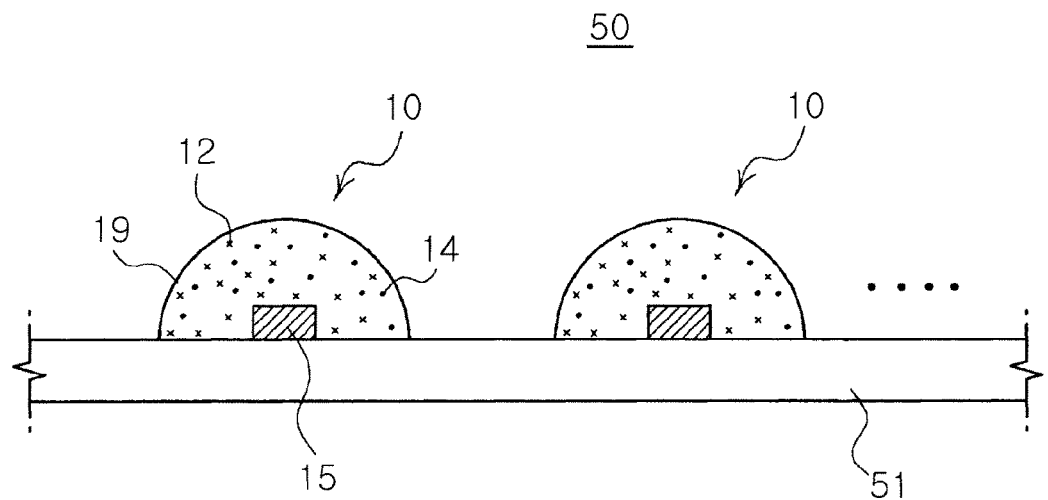
FIG. 25 is a side cross-sectional view schematically showing an LED light source module according to an embodiment of the present invention.
Figure 26:
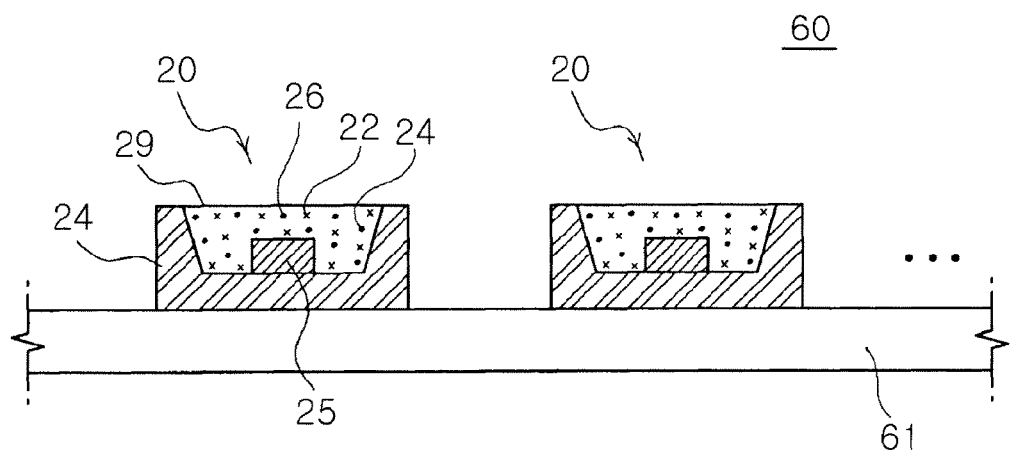
FIG. 26 is a side cross-sectional view schematically showing an LED light source module according to another embodiment of the present invention.

According to an embodiment of the present invention, a white light source module, which may be usefully utilized as a light source of an LCD backlight unit, may be provided. Namely, the white light source module according to the embodiment of the present invention may be coupled, as a light source of the LCD backlight unit, with various optical members (a diffuser, a light guide plate, a reflective plate, a prism sheet, and the like) to configure a backlight assembly. FIGS. 25 and 26 illustrate such white light source modules.

First, with reference to FIG. 25, a light source module 50 for an LCD backlight may include a circuit board 51 and an array of a plurality of white LED devices 10 mounted on the circuit board 51. A conductive pattern (not shown) may be formed on an upper surface of the circuit board 51 such that it is connected to the LED devices 10.

Each of the white LED devices 10 may be understood as being the white LED device described above with reference to FIG. 19. Namely, the blue LED 15 may be directly mounted in a COB (Chip On Board) manner on the circuit board 51. Each of the white LED devices 10 may be configured to include the hemispherical resin packaging part 19 having a lens function without a separate reflective wall, thus having a wide orientation angle. The wide orientation angle of each of the white light sources may contribute to a reduction in the size (i.e., the thickness or the width) of an LCD display.

With reference to FIG. 26, a light source module 60 for an LCD backlight may include a circuit board 61 and an array of a plurality of white LED devices 20 mounted on the circuit board 61. As described above with reference to FIG. 20, the white LED devices 20 may include the blue LED chip 25 mounted within a reflective cup of the package main body 21 and the resin packaging part 29 encapsulating the blue LED chip 25. The yellow or yellowish-orange phosphor 26, together with the green phosphor 22 and the red phosphor 24, may be dispersed and included in the resin packaging part 29.

Various types of white light emitting devices using the foregoing phosphors as wavelength conversion materials may be implemented according to embodiments of the present invention. Hereinafter, a light emitting device which may be employed for the white light emitting device according to an embodiment of the present invention will now be described.

Figure 27:
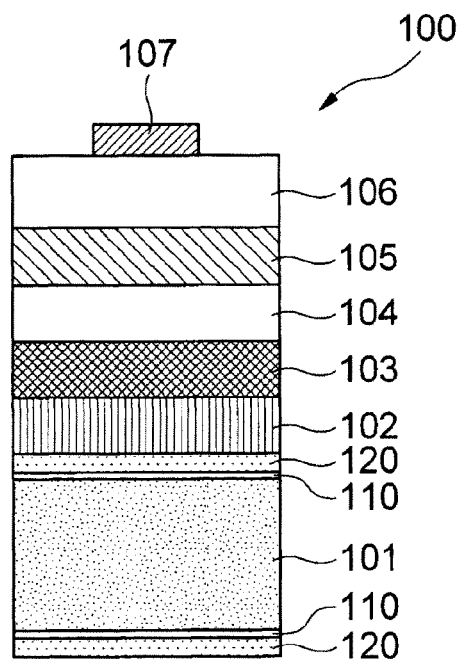
FIG. 27 is a side cross-sectional view of a light emitting device applicable to a white light emitting device as an example of the present invention.

First, a semiconductor stacked structure of a light emitting device 100 illustrated in FIG. 27 may have the following structure. A substrate formed of an Si—Al alloy (hereinafter, referred to as a 'Si—Al alloy substrate') is formed, a protective layer 120 is formed on upper and lower surfaces of the Si—Al alloy substrate 101, and a junction metal layer 102, a reflective metal layer 103, a p type semiconductor layer 104, an active layer 105, and an n type semiconductor layer 106 may be sequentially stacked on the protective layer 120. The p type and n type semiconductor layers 104 and 106, and the active layer 105 may be formed of a GaN-based semiconductor, namely, $Al_xGa_yIn_{(1-x-y)}N$ ($0 \leq x \leq 1$, $0 \leq y \leq 1$, $0 x+y \leq 1$) semiconductor material, or the like, and constitute a light emission structure.

An n-sided electrode 107 may be formed on the n type semiconductor layer 106. The reflective metal layer 103 interposed between the junction metal layer 102 and the p type semiconductor layer 104 may reflect light upwardly, which is made incident from the semiconductor layer, to thus increase the luminance of the light emitting element. The reflective metal layer 103 may be formed of a metal having a high level of reflectivity, e.g., a metal selected from the group consisting of gold (Au), silver (Ag), aluminum (Al), and rhodium (Rh), or an alloy of two or more thereof. The reflective metal layer 103 may be omitted as necessary.

The junction metal layer 102 may serve to connect the Si—Al alloy substrate 101 to the light emission structure. The junction metal layer 102 may be formed of gold (Au), or the like. Here, the light emitting device 100 may include the junction metal layer 102, but the Si—Al alloy substrate 101 may be directly connected to the p type semiconductor layer 104 without the junction metal layer 102 therebetween. Thus, the light emitting device 100 according to an embodiment of the present invention may use the Si—Al alloy substrate 101 as a conductive substrate.

The Si—Al alloy may be useful in terms of thermal expansion coefficient, heat conductivity, mechanical processibility and cost. Namely, the thermal expansion coefficient of the Si—Al alloy substrate 101 may be similar to that of a sapphire substrate. Thus, when the light emitting device 100 is manufactured by using the Si—Al alloy substrate 101, a phenomenon in which a substrate is bent, occurring in a process of bonding an existing conductive substrate formed of silicon (Si) and a process of separating a sapphire substrate according to laser irradiation, and crack generation in a light emission structure may be drastically reduced to obtain a high quality light emitting device 100 with reduced defects.

Also, the heat conductivity of the Si—Al alloy substrate 101 may range from 120 to 180 W/m K, providing excellent heat discharge characteristics. Also, because the Si—Al alloy substrate 101 may be easily manufactured by melting silicon (Si) and aluminum (Al) at a high pressure, it may be easily obtained at a low cost.

In particular, the light emitting device 100 according to the present embodiment may further include the protective layer 120 formed on the upper and lower surfaces of the Si—Al alloy substrate 101 in order to prevent a chemical infiltration to the Si—Al alloy substrate 101 during a cleaning operation. Here, the protective layer 120 may be formed of a metal or a conductive dielectric, or the like. When the protective layer 120 is formed of a metal, it may be formed of at least one of nickel (Ni), gold (Au), copper (Cu), tungsten (W), chromium (Cr), molybdenum (Mo), platinum (Pt), ruthenium (Ru), rhodium (Rh), titanium (Ti), and tantalum (Ta), or an alloy of at least two or more thereof.

In this case, the protective layer 120 may be formed through an electroless plating method, metal deposition, sputtering, CVD, or the like, and a seed metal layer 110 serving as a seed in the process of plating the protective layer 120 may be further formed between the Si—Al alloy substrate 101 and the protective layer 120 formed of a metal material. The seed metal layer 110 may be formed of titanium (Ti)/gold (Au), or the like. Also, when the protective layer 120 is formed of a conductive dielectric, the conductive dielectric may be formed of ITO (Indium Tin Oxide), IZO (Indium Zinc Oxide), or CIO (Copper Indium Oxide). In this case, the protective layer 120 may be formed through deposition, sputtering, or the like. The protective layer 120 may be formed to have a thickness ranging from 0.01 μm to 20 μm, and may preferably have a thickness ranging from 1 μm to 10 μm.

In this manner, in the light emitting device which may be employed for the white light emitting device according to an embodiment of the present invention, since the protective layer 120 formed of a material such as nickel (Ni) is formed on the surface of the Si—Al alloy substrate 101, the Al metal of the Si—Al alloy substrate 101 may be prevented from being etched by chemicals such as HCL, HF, KOH, or the like, used in a cleaning process performed after the sapphire substrate is separated or by a chemical such as KOH used in a process of texturing the surface of the n type semiconductor layer 106.

Thus, in the light emitting device which may be employed for the white light emitting device according to an embodiment of the present invention, formation of protrusions and depressions on the surface of the Si—Al alloy substrate 101 may be prevented, and thus, the light emission structure bonded to the Si—Al alloy substrate 101 may be prevented from being peeled off.

The use of the metal such as nickel (Ni) or the like, as a material of the protective layer 120, may improve the surface roughness of the Si—Al alloy substrate 101 to thus solidify the junction (or bond) between the Si—Al alloy substrate 101 and the light emission structure. Namely, in the related art, before the formation of the junction metal layer 102, the Si—Al alloy substrate 101 may undergo a cleaning process using a chemical material such as an acid, or the like, to remove a natural oxide layer, so the Al metal on the surface of the Si—Al alloy substrate 101 may be etched to result in the formation of protrusions and depressions ranging from 200 nm to 500 nm on average on the surface of the Si—Al alloy substrate 101. However, in Embodiment 1 of the present invention, the metal such as nickel (Ni), or the like, may be formed as the protective layer 120 on the surface of the Si—Al alloy substrate 101 and the Si—Al alloy substrate 101 may be subjected to an Ni CMP (Chemical Mechanical Polishing) process. Thus, the surface protrusions and depressions may be reduced to 5 nm or smaller, improving the surface roughness to appear like a mirror face.

As such, the surface roughness of the Si—Al alloy substrate 101 may be improved, the junction between the Si—Al alloy substrate 101 and the light emission structure may be solidified, and the junction yield may be improved.

FIG. 25 shows another example of a light emitting element which may be employed for the white light emitting device according to an embodiment of the present invention.

Figure 28:
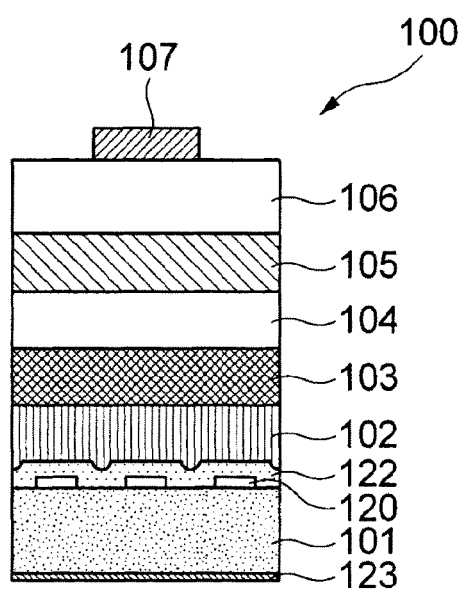
FIG. 28 is a side cross-sectional view of a light emitting device applicable to a white light emitting device as another example of the present invention.

The light emitting device illustrated in FIG. 28 may be similar to the light emitting device illustrated in FIG. 27, except that the protective layer 120 is formed on the upper surface of the Si—Al alloy substrate 101 such that portions of the Si—Al alloy substrate 101 are exposed, without being formed on the entirety of the upper and lower surfaces of the Si—Al alloy substrate 101, a conductive layer 122 is formed on the protective layer 120 and on the portions of the upper surface of the Si—Al alloy substrate 101 exposed by the protective layer 120, and a contact metal layer 123 is formed on a lower surface of the Si—Al alloy substrate 101.

In particular, the protective layer 120 may be formed of an insulating material, instead of a metal or conductive dielectric. That is, in the light emitting device according to Embodiment 2 of the present invention, since the protective layer 120 is formed of an insulating material, not a metal or a conductive dielectric, the protective layer 120 may be formed to expose portions of the upper surface of the Si—Al alloy substrate 101 and the conductive layer 122 may be additionally formed on the upper surface of the Si—Al alloy substrate 101 including the protective layer 120, in order to allow the Si—Al alloy substrate 101 with the protective layer 120 formed thereon and the light emission structure at the upper side of the protective layer 120 to be electrically connected. Here, the conductive layer 122 may be formed of a metal, or the like.

Figure 29:
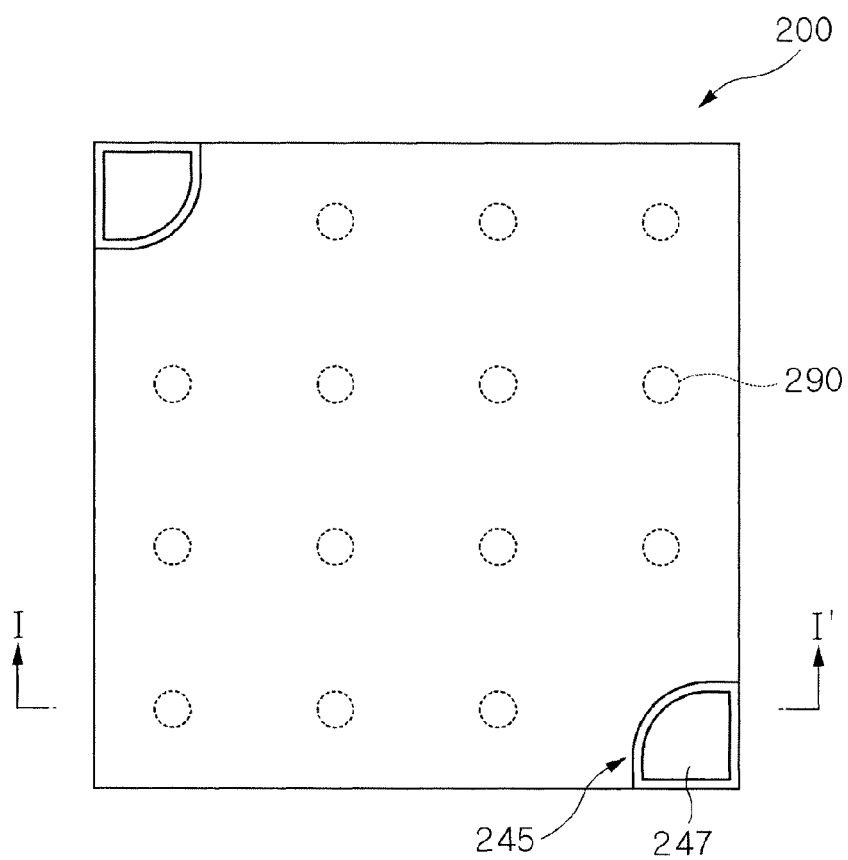
FIGS. 29 and 30 are a plan view and a side sectional view showing an example of a light emitting device which may be employed in a white light emitting device according to an embodiment of the present invention.
Figure 30:
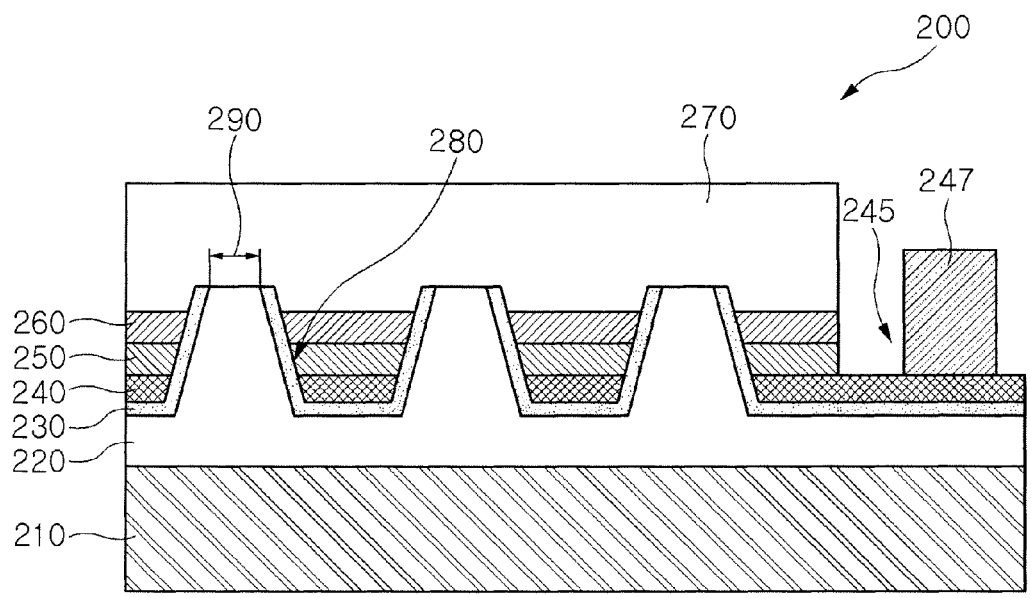

Meanwhile, unlike the light emitting device having the configuration as described above, the white light emitting device according to the present embodiment may employ a light emitting device having an electrode disposition structure modified to allow for a high current operation. FIGS. 29 and 30 are a plan view and a side sectional view showing an example of a light emitting device which may be employed in a white light emitting device according to an embodiment of the present invention. FIG. 30 is a sectional view taken along line I-I' in FIG. 31.

With reference to FIGS. 29 and 30, a light emitting device 200 may include a conductive substrate 210, a first electrode layer 220, an insulating layer 230, a second electrode layer 240, a second conductive semiconductor layer 250, an active layer 260, and a first conductive semiconductor layer 270, and the respective layers may be sequentially stacked.

The conductive substrate 210 may be formed of a material allowing electricity to flow therethrough. For example, the conductive substrate 210 may be a metal substrate including at least one of metals among gold (Au), nickel (Ni), copper (Cu), and tungsten (W), or may be a semiconductor substrate including any one of silicon (Si), germanium (Ge), and gallium arsenide (GaAs). The first electrode layer 220 may be stacked on the conductive substrate 210. The first electrode layer 220 may be electrically connected to the conductive substrate 210 and the active layer 260, so it may be formed of a material for significantly reducing contact resistance with the conductive substrate 210 and the active layer 260.

As shown in FIG. 30, portions of the first electrode layer 220 stacked on the conductive substrate 210 may penetrate the insulating layer 230, the second electrode layer 240, the second conductive semiconductor layer 250, and the active layer 260, and extend through contact holes 280 penetrating even up to a certain area of the first conductive semiconductor layer 270 so as to be brought into contact with the first conductive semiconductor layer 270, thus electrically connecting the conductive substrate 210 and the conductive semiconductor layer 270. Namely, the first electrode layer 220 may electrically connect the conductive substrate 210 and the first conductive semiconductor layer 270 through the contact holes 280, so the first electrode layer 220 and the first conductive semiconductor layer 270 may be electrically connected through the size of the contact holes 280, more accurately, through contact areas 290, in which they are in contact.

Meanwhile, the insulating layer 230 may be provided on the first electrode layer 220 in order to electrically insulate the first electrode layer 220 from other layers, except for the conductive substrate 210 and the first conductive semiconductor layer 270. Namely, the insulating layer 230 may be provided between the sides of the second electrode layer 240, the second conductive semiconductor layer 250, and the active layer 260 exposed to the contact hole 280 and the first electrode layer 220, as well as between the first electrode layer 220 and the second electrode layer 240. Also, the insulating layer 230 may be also formed to the side of a certain area of the first conductive semiconductor layer 280 through which the contact hole 280 may penetrate, so as to insulate the same.

The second electrode layer 240 may be provided on the insulating layer 220. Of course, the second electrode layer does not exist in the certain areas in which the contact holes 280 are formed in a penetrative manner. In this case, as shown in FIG. 30, the second electrode layer 240 may include an exposed area of the interface in contact with the second conductive semiconductor layer 250, namely, at least one exposed area 245. An electrode pad part 247 may be provided on the exposed area 245 in order to connect external power to the second electrode layer 240.

Meanwhile, the second conductive semiconductor layer 250, the active layer 260, and the first conductive semiconductor layer 270 (to be layer explained) do not exist on the exposed area 245. Also, as shown in FIG. 29, the exposed area 245 may be formed on the corner of the semiconductor light emitting device 200 in order to significantly increase a light emission area of the semiconductor light emitting device 200. Meanwhile, the second electrode layer 240 may include at least one of metals among silver (Ag), aluminum (Al), and platinum (Pt). This is due to the fact that as the second electrode layer 240 is electrically in contact with the second conductive semiconductor layer 250, it needs to be provided as a layer having the characteristics of significantly reducing contact resistance of the second conductive semiconductor layer 250 and having the function of outwardly reflecting light generated from the active layer 260 to thus increase luminous efficiency.

The second conductive semiconductor layer 250 may be provided on the second electrode layer 240, and the active layer 260 may be provided on the second conductive semiconductor layer 250, and the first conductive semiconductor layer 270 may be provided on the active layer 260. In this case, the first conductive semiconductor layer 270 may be an n type nitride semiconductor, and the second conductive semiconductor layer 250 may be a p type nitride semiconductor. Meanwhile, the active layer 260 may be formed with a material selected according to the material of the first and second conductive semiconductor layers 270 and 250. Namely, the active layer 260 may change energy into light according to electron hole recombination and emit the light, so the active layer 260 may be formed of a material having an energy band gap smaller than that of the first and second conductive semiconductor layers 270 and 250.

Meanwhile, in the light emitting device according to the present embodiment, the first electrode layer connected to the contact hole may be exposed to the outside, unlike the light emitting device illustrated in FIG. 28.

Figure 31:
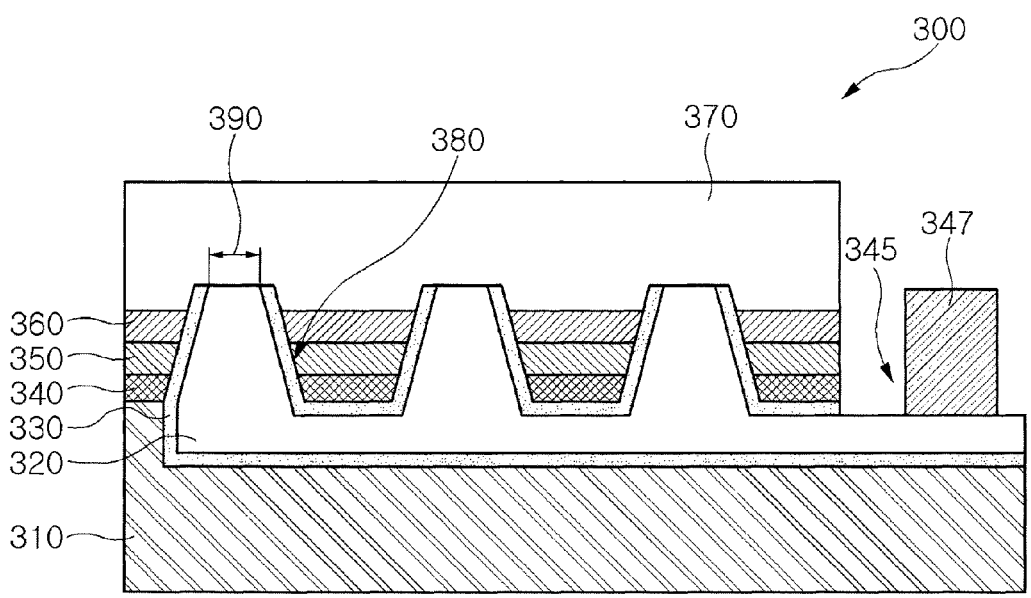
FIG. 31 is a side sectional view showing another example of a light emitting device which may be employed in a white light emitting device according to an embodiment of the present invention.

In the case of a light emitting device 300 illustrated in FIG. 31, a second conductive semiconductor layer 350, an active layer 360, and a first conductive semiconductor layer 370 are formed on a conductive substrate 310. In this case, a second electrode layer 340 may be disposed between the second conductive semiconductor layer 350 and the conductive substrate 310, but the second electrode layer 340 may not be necessarily formed.

In the present embodiment, a contact hole 390 having a contact area 390 in contact with the first conductive semiconductor layer 370 may be connected to the first electrode layer 320, and the first electrode layer 320 may be exposed to have an electrical connection part 345. An electrode pad part 347 may be formed on the electrical connection part 345. The first electrode layer 320 may be electrically separated from the active layer 360, the second conductive semiconductor layer 350, the second electrode layer 340, and the conductive substrate 310 by means of an insulating layer 330.

Unlike the former embodiment in which the contact hole is connected to the conductive substrate, in the present embodiment, the contact hole 380 may be electrically separated from the conductive substrate 310, and the first electrode layer 320, connected to the contact hole 380 may be exposed to the outside. Accordingly, the conductive substrate 310 may be electrically connected to the second conductive semiconductor layer 340 to have a polarity changed as compared to that of the former embodiment.

Accordingly, in the light emitting element, a portion of a first electrode may be formed on the light emission surface and the other portion of the first electrode may be disposed at the lower side of the active layer, thus securing a maximum possible level in a light emission area, and since the electrode disposed on the light emission surface is uniformly disposed, even in the case a high operation current is applied thereto, the current may be uniformly distributed to thus reduce a current concentration in a high current operation.

In this manner, the light emitting device illustrated in FIGS. 30 and 31 may include a semiconductor stacked body having first and second conductive semiconductor layers providing first and second main surfaces opposed to each other and an active layer formed between the first and second conductive semiconductor layers, a contact hole connected to one area of the first conductive semiconductor layer from the second main surface through the active layer, a first electrode formed on the second main surface of the semiconductor stacked body and connected to one area of the first conductive semiconductor layer through the contact hole, and a second electrode formed on the second conductive semiconductor layer formed on the second main surface of the semiconductor stacked body, to be connected to the second conductive semiconductor layer. Here, any one of the first and second electrodes may be exposed to a side surface of the semiconductor stacked body.

Figure 32A:
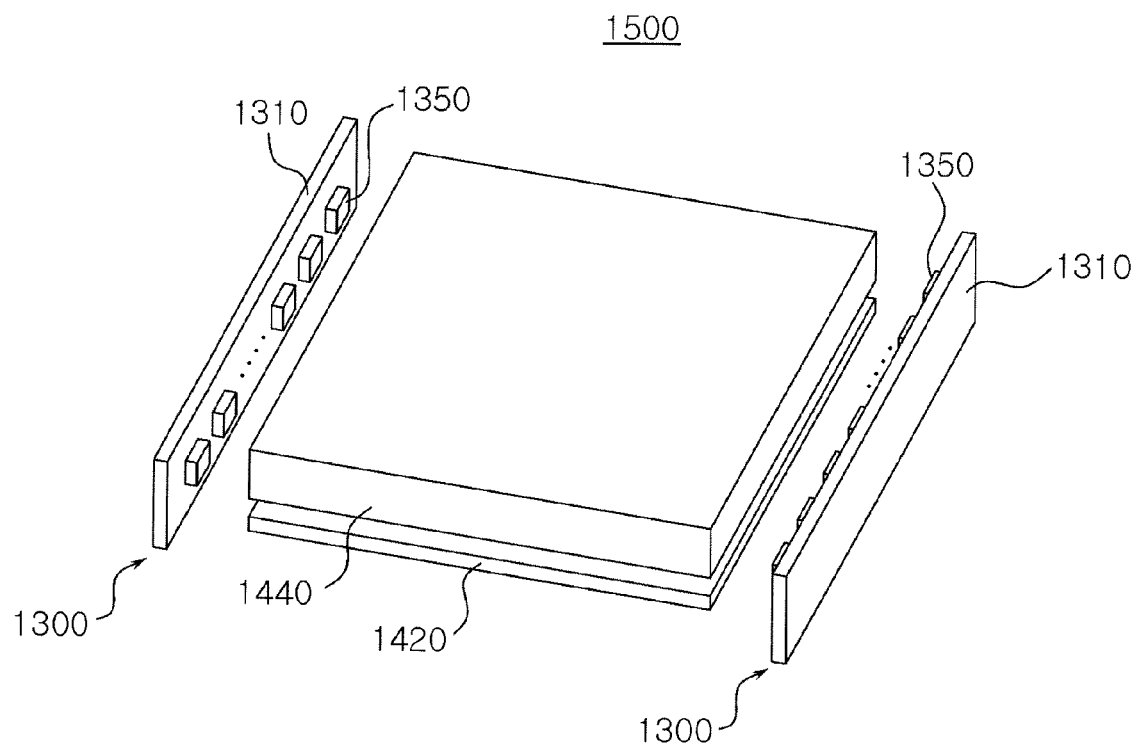
FIGS. 32A and 32B are cross-sectional views showing a backlight unit according to various embodiments of the present invention.
Figure 32B:
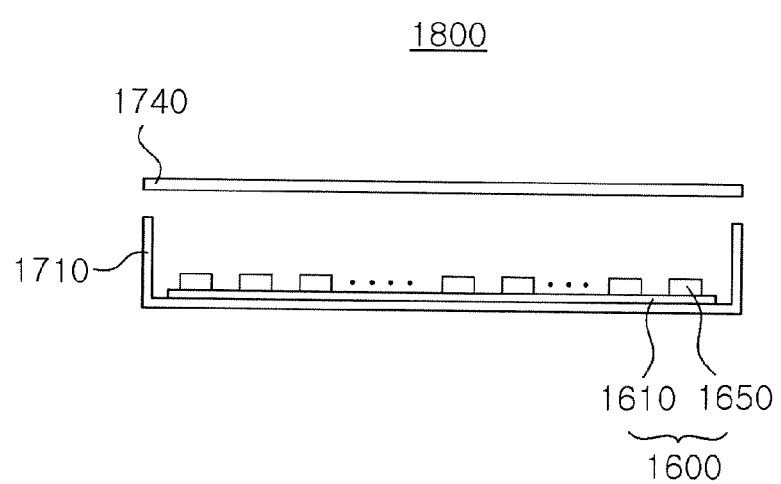

FIGS. 32A and 32B are sectional views of a backlight unit according to embodiments of the present invention.

With reference to FIG. 32A, an edge type backlight unit 1500 is illustrated as an example of a backlight unit to which a light emitting diode package according to an embodiment of the present invention may be applicable as a light source.

In the present embodiment, the edge type backlight unit 1400 may include a light guide plate 1440 and an LED light source module 1300 provided on both sides of the light guide plate 1440.

In the present embodiment, the LED light source module 1300 may be provided on both sides of the light guide plate 1440 opposed to each other, but the LED light source module 1300 may be provided only to one side, or alternatively, an additional LED light source module may be provided to the other side.

As shown in FIG. 32A, a reflective plate 1420 may be additionally provided under the light guide plate 1440. The LED light source module 1300 employed according to the present embodiment may include a printed circuit board (PCB) 1310 and a plurality of LED light sources 1350 mounted on the upper surface of the PCB 1310, and the light emitting device package using the foregoing phosphors may be applied as the LED light source 1350.

With reference to FIG. 32B, a direct type backlight unit 1800 is illustrated as an example of a different type of backlight unit.

In the present embodiment, the direct type backlight unit 1800 may include a light diffuser 1740 and an LED light source module 1600 arranged on a lower surface of the light diffuser 1740.

The backlight unit 1800 illustrated in FIG. 32B may further include a bottom case 1710 for accommodating the light source modules at a lower part of the light diffuser 1740.

The LED light source module 1600 employed in the present embodiment may include a PCB 1610 and a plurality of LED light sources 1650 mounted on an upper surface of the PCB 1610. The plurality of LED light sources 1650 may be a light emitting device package using the foregoing phosphors as wavelength conversion materials.

Figure 34:
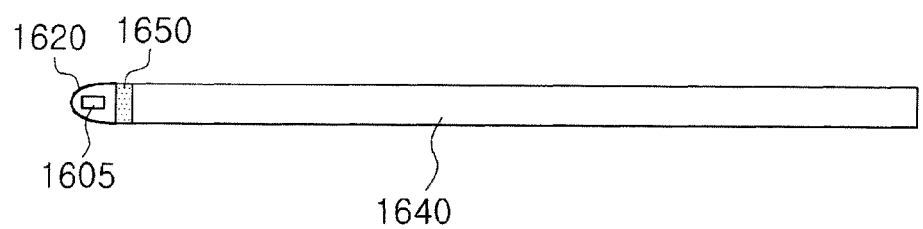
FIGS. 34 and 35 are sectional views of an edge type backlight unit according to another embodiment of the present invention.
Figure 35:
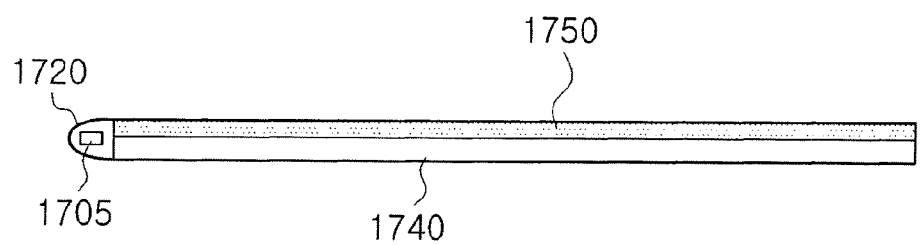

Besides the foregoing embodiments, a phosphor may be disposed on a different element of the back light unit, rather than being disposed on the package in which the LED is positioned, to convert light. This embodiment is illustrated in FIGS. 33 to 35.

Figure 33:
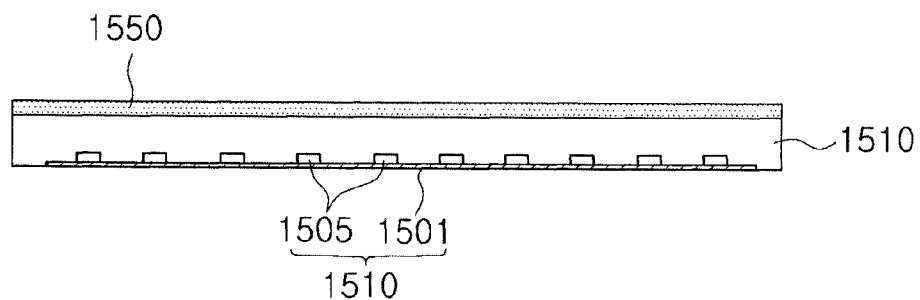
FIG. 33 is a sectional view of a direct type backlight unit according to an embodiment of the present invention.

First, as shown in FIG. 33, the direct type backlight unit 1500 according to the present embodiment may include a phosphor film 1550, and a LED light source module 1510 arranged on a lower surface of the phosphor film 1550.

The backlight unit 1500 illustrated in FIG. 33 may include a bottom case 1560 for accommodating the light source module 1510. In the present embodiment, the phosphor film 1550 may be disposed on an upper surface of the bottom case 1560. At least a portion of light emitted from the light source module 1510 may be wavelength-converted by the phosphor film 1550. The phosphor film 1550 may be fabricated as a separate film and applied, or may be provided in the form of being integrally coupled with the light diffuser.

Here, the LED light source module 1510 may include a PCB 1501 and a plurality of LED light sources 1505 mounted on an upper surface of the PCB 1501.

FIGS. 34 and 35 are sectional views of an edge type backlight unit according to another embodiment of the present invention.

An edge type backlight unit 1600 illustrated in FIG. 34 may include a light guide plate 1640 and an LED light source 1605 provided at one side of the light guide plate 1640. Light emitted from the LED light source 1605 may be guided to the interior of the light guide plate 1640 by means of a reflection structure. In the present embodiment, a phosphor film 1650 may be positioned between the side of the light guide plate 1640 and the LED light source 1605.

An edge type backlight unit 1700 illustrated in FIG. 35 may include a light guide plate 1740, an LED light source 1705 provided on one side of the light guide plate 1740, and the reflection structure (not shown), similarly to the edge type backlight unit 1600 illustrated in FIG. 34. In the present embodiment, a phosphor film 1750 is illustrated as being applied to a light emission surface of the light guide plate 1740.

In this manner, the phosphor according to the present embodiment may be implemented such that it is applied to a different device such as the backlight unit, or the like, rather than being directly applied to the LED light source.

Figure 36:
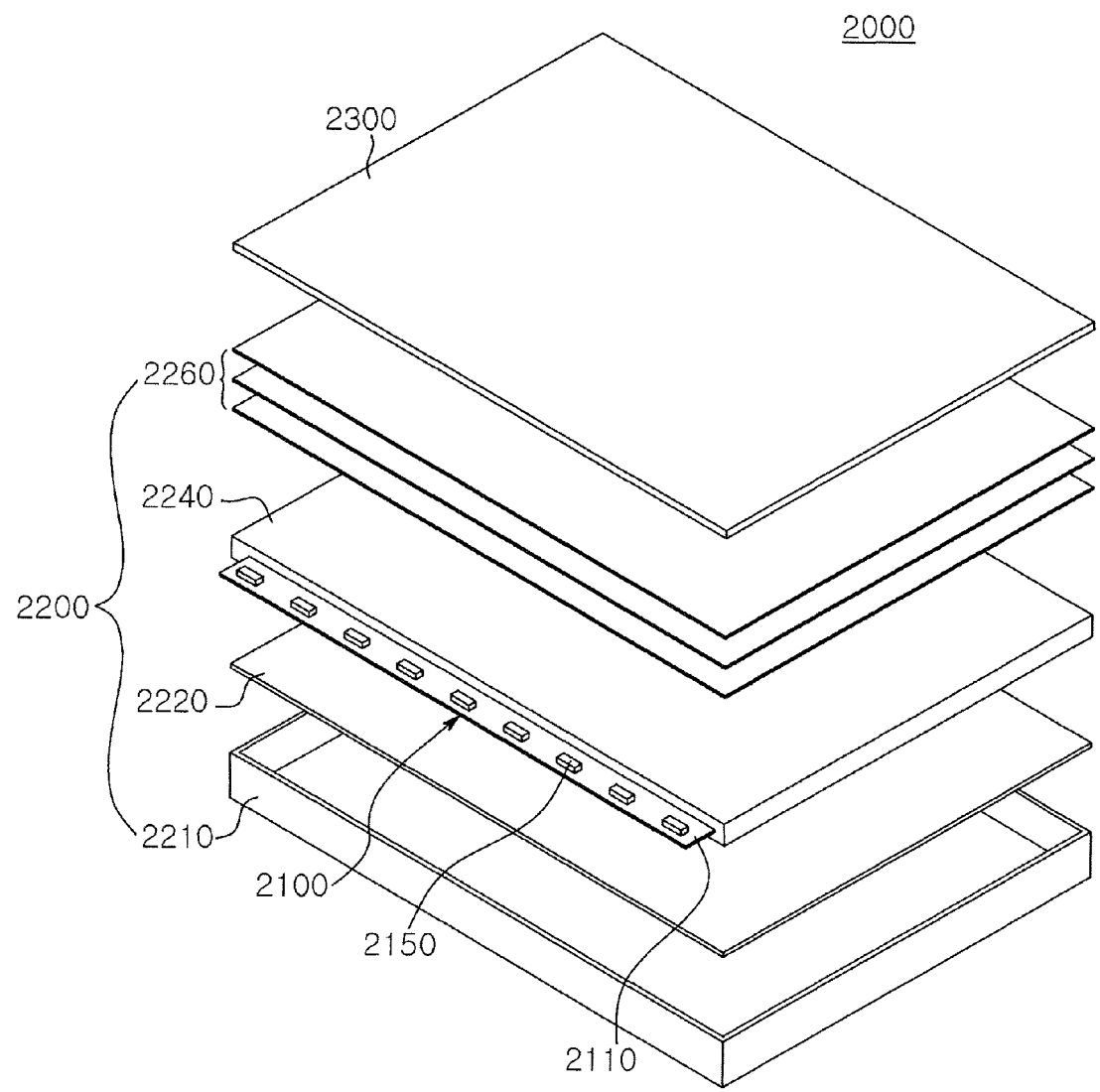
FIG. 36 is an exploded perspective view of a display apparatus according to an embodiment of the present invention.

FIG. 36 is an exploded perspective view of a display apparatus according to an embodiment of the present invention.

A display apparatus 2400 illustrated in FIG. 36 may include a backlight unit 2200 and an image display panel 2300 such as a liquid crystal panel. The backlight unit 2200 may include a light guide plate 2240 and an LED light source module 2100 provided on at least one side of the light guide plate 2240.

In the present embodiment, the backlight unit 2200 may further include a bottom case 2210 and a reflective plate 2220 positioned at a lower part of the light guide plate 2240.

Also, various types of optical sheets 2260, such as a diffusion sheet, a prism sheet, or a protection sheet, may be disposed between the light guide plate 2240 and the liquid crystal panel 2300 according to demand for various optical characteristics.

The LED light source module 2100 may include a PCB 2110 provided on at least one side of the light guide plate 2240 and a plurality of LED light sources 2150 mounted on the PCB 2110 to emit light to the light guide plate 2240. The plurality of LED light sources 2150 may be the foregoing light emitting device package. The plurality of LED light sources employed in the present embodiment may be a side view type light emitting device package in which the sides of the plurality of LED light sources are mounted to be adjacent to the light emission surface.

As described above, the foregoing phosphors may be applicable to an LED light source module applied to various mounting structures of packages and providing various types of white light. The foregoing light emitting device package or a light source module including the same may be applicable to various types of display apparatuses or illumination devices.

While the present invention has been shown and described in connection with the embodiments, it will be apparent to those skilled in the art that modifications and variations can be made without departing from the spirit and scope of the invention as defined by the appended claims.

The invention claimed is:

1. A phosphor having a β-type $Si_3N_4$ crystal structure and including oxynitride expressed by an empirical formula $Si_{6-z}Al_zO_zN_{8-z}:Eu_a,M_b$, M being at least one selected from among strontium (Sr) and barium (Ba), an amount (a) of europium (Eu) ranging from 0.1 to 5 mol %, an amount (b) of M ranging from 0.1 to 10 mol %, and a composition rate (z) of aluminum (Al) satisfying 0.1<z<1, and the phosphor emitting light having a peak wavelength ranging from 500 to 550 in when excitation light is irradiated thereto, wherein M is a dopant of the phosphor and is disposed in an interstitial space of the phosphor.

2. The phosphor of claim 1, wherein the excitation light has a peak wavelength ranging from 300 to 480 nm.

3. The phosphor of claim 2, wherein a peak wavelength of the light emitted from the phosphor is 540 nm or less when the phosphor is irradiated by the excitation light.

4. The phosphor of claim 1, wherein when the light emitted from the phosphor due to the irradiated excitation light is represented as an (x, y) value in the CIE 1931 chromaticity coordinates, x and y respectively satisfy x≤0.336 and y≥0.637.

5. The phosphor of claim 1, wherein in the CIE 1931 chromaticity coordinates of the light emitted from the phosphor, an amount of change of y is −0.0065 or less, and the amount of change of y is defined as y2−y1 when a value of y is y1 in the CIE 1931 chromaticity coordinates, measured from the light emitted initially on the condition of driving a blue light emitting diode having the phosphor applied thereto at 3.3 V, 120 mA, and a value of y is y2 in the CIE 1931 chromaticity coordinates, measured from the light emitted after the above driving condition is continuously performed for 24 hours at 85° C.

6. The phosphor of claim 1, wherein M is strontium (Sr).

7. The phosphor of claim 6, wherein the amount (a) of the strontium (Sr) ranges from 0.5 to 3 mol %.

8. The phosphor of claim 7, wherein the amount (a) of the strontium (Sr) ranges from 1 to 1.5 mol %.

9. The phosphor of claim 1, wherein the composition rate (z) of aluminum (Al) ranges from 0.1 to 0.3 mol %.

10. The phosphor of claim 1, wherein the amount (b) of europium (Eu) ranges from 0.9 to 3 mol %.

11. The phosphor of claim 1, wherein M contains both barium (Ba) and strontium (Sr).

12. The phosphor of claim 1, wherein a value D50 in a grain size of the phosphor powder ranges from 14.5 to 18.5 μm.

13. The phosphor of claim 1, wherein the phosphor is an activator and further contains at least one element selected from a group consisting of lithium (Li), sodium (Na), potassium (K), magnesium (Mg) and calcium (Ca).

14. A surface light source apparatus using the phosphor according to claim 1, as a wavelength conversion material.

15. A surface light source apparatus comprising:

a light guide plate; and an LED light source module disposed on at least one side of the light guide plate to provide light to the interior of the light guide plate, the LED light source module including a circuit board, and a plurality of white light emitting devices mounted on the circuit board and using the phosphor according to claim 1 as a wavelength conversion material.

16. A display apparatus comprising:

an image display panel displaying an image; and a backlight unit having the surface light source apparatus according to claim 15 to provide light to the image display panel.

17. A display apparatus using the phosphor according to claim 1, as a wavelength conversion material.

18. An illumination device using the phosphor according to claim 1 as a wavelength conversion material.

19. An illumination device comprising:

an LED light source module; and a diffusion sheet disposed at an upper part of the LED light source module and uniformly diffusing light input from the LED light source module, the LED light source module including a circuit board and a plurality of white light emitting devices mounted on the circuit board and using the phosphor according to claim 1 as a wavelength conversion material.

20. A method of manufacturing an oxynitride phosphor having β-type $Si_3N_4$ crystal structure expressed by an empirical formula $Si_{6-z}Al_zO_zN_{8-z}:Eu_a,M_b$, M being at least one selected from among strontium (Sr) and barium (Ba), an amount (a) of europium (Eu) ranging from 0.1 to 5 mol %, an amount (b) of M ranging from 0.1 to 10 mol %, and a composition rate (z) of aluminum (Al) satisfying 0.1<z<1, the method comprising:

weighing raw materials including an Si-containing oxide or nitride, an Al-containing oxide or nitride, an Eu-containing compound and an M-containing compound;

preparing a primary mixture by mixing the raw materials, excepting the M-containing compound;

primarily firing the primary mixture and grinding the primarily fired mixture;

preparing a secondary mixture by mixing the M-containing compound with the ground mixture; and secondarily firing the secondary mixture and grinding the secondarily fired mixture.

21. The method of claim 20, wherein the primary firing process is performed in a firing temperature range of 1850 to 2300° C., and the secondary tiring process is performed at a temperature lower than that of the primary firing process.

22. The method of claim 20, wherein the primary and secondary firing processes are performed under an atmosphere of nitrogen gas or a mixture of nitrogen and hydrogen gasses.

23. The method of claim 20, wherein the M-containing compound is strontium (Sr).

24. The method of claim 23, wherein the amount (a) of the strontium (Sr) ranges from 0.5 to 3 mol %.

25. The method of claim 24, wherein the amount (a) of the strontium (Sr) ranges from 1 to 1.5 mol %.

26. The method of claim 20, wherein the composition rate (z) of aluminum (Al) ranges from 0.1 to 0.3 mol %.

27. The method of claim 20, wherein the amount (b) of europium (Eu) ranges from 0.9 to 3 mol %.

28. The method of claim 20, wherein the M-containing compound contains both a barium (Ba)-containing compound and a strontium (Sr)-containing compound.

29. The method of claim 20, wherein the preparing of the secondary mixture includes adding a compound containing at least one element selected from a group consisting of Li, Na, K, Mg and Ca, as an activator together with the M-containing compound.

30. A white light emitting device comprising:
a light emitting diode (LED) chip emitting excitation light;
a green phosphor disposed around the LED chip to wavelength-convert at least a portion of the excitation light and including the phosphor according to claim 1; and
at least one light emitting element emitting light of a wavelength different from a wavelength of the LED chip and a wavelength of the green phosphor, the at least one light emitting element being at least one of an additional LED chip and a different type of phosphor.

31. The device of claim 30, wherein the LED chip is an LED chip emitting ultraviolet light, or an LED chip emitting visible light having a peak wavelength of 470 nm or more.

32. The device of claim 30, wherein the LED chip is a blue LED chip having a peak wavelength ranging from 430 nm to 470 nm, and the at least one light emitting element includes a red phosphor.

33. The device of claim 32, wherein a light emission wavelength peak of the red phosphor ranges from 600 nm to 660 nm, and a light emission wavelength peak of the green phosphor ranges from 500 nm to 550 nm.

34. The device of claim 33, wherein the light emission wavelength peak of the green phosphor ranges from 535 nm to 545 nm, and a full width of a half maximum (FWHM) of the light emission wavelength ranges from 60 nm to 80 nm.

35. The device of claim 33, wherein in the CIE 1941 color coordinate system, a color coordinate of light emitted from the red phosphor is within the range of $0.55 \leq x \leq 0.65$ and $0.25 \leq y \leq 0.35$, respectively, and a color coordinate of light emitted from the blue LED chip is within the range of $0.1 \leq x \leq 0.2$ and $0.02 \leq y \leq 0.15$, respectively.

36. The device of claim 32, wherein the blue LED chip has a full width of a half maximum (FWHM) ranging from 10 nm to 50 nm, and the green phosphor has a full width of a half maximum (FWHM) ranging from 30 nm to 200 nm, and the red phosphor has a full width of a half maximum (FWHM) ranging from 50 nm to 250 nm.

37. The device of claim 32, wherein the red phosphor is at least one selected from among a nitride-based phosphor of $M1AlSiN_x:Re(1<x<5)$, a sulfide-based phosphor of M1D:Re, and a silicate-based phosphor of $(Sr,L)_2SiO_{4-x}N:Eu$, $(0<x<4, y=2x/3)$,
wherein M1 is at least one element selected from among barium (Ba), strontium (Sr), calcium (Ca), and magnesium (Mg), D is at least one element selected from among sulfur (S), selenium (Se), and tellurium (Te), L is at least one group II element selected from a group consisting of Ba, Ca and Mg, or at least one group I element selected from a group consisting of lithium (Li), sodium (Na), potassium (K), rubidium (Rb), and cesium (Cs), and Re is at least one selected from among yttrium (Y), lanthanum (La), cerium (Ce), neodymium (Nd), promethium (Pm), samarium (Sm), gadolinium (Gd), terbium (Tb), dysprosium (Dy), holmium (Ho), erbium (Er), thulium (Tm), ytterbium (Yb), lutetium (Lu), F, chlorine (Cl), bromine (Br), and iodine (I).

38. The device of claim 32, wherein the at least one light emitting element further includes a yellow or a yellowish-orange phosphor.

39. The device of claim 38, wherein the yellow phosphor is a silicate-based phosphor, and the yellowish-orange phosphor is a α-SiAlON:Re phosphor.

40. The device of claim 32, wherein a color endering index (CRI) of white light emitted from the white light emitting device is 70 or higher.

41. The device of claim 30, wherein the at least one light emitting element is a red LED chip.

42. The device of claim 30, wherein the LED chip has a structure in which first and second electrodes are disposed to face the same surface.

43. The device of claim 30, wherein the LED chip has a structure in which the respective first and second electrodes are disposed to face different surfaces opposed to each other.

44. The device of claim 30, wherein the LED chip includes a semiconductor stacked body having first and second conductive semiconductor layers providing first and second main surfaces opposed to each other and an active layer formed between the first and second conductive semiconductor layers, a contact hole connected to one area of the first conductive semiconductor layer from the second main surface through the active layer, a first electrode formed on the second main surface of the semiconductor stacked body and connected to one area of the first conductive semiconductor layer through the contact hole, and a second electrode formed on the second conductive semiconductor layer formed on the second main surface of the semiconductor stacked body, to be connected to the second conductive semiconductor layer.

45. The device of claim 44, wherein any one of the first and second electrodes is exposed to a side surface of the semiconductor stacked body.

46. The device of claim 30, further comprising a package main body having a recess in which the LED chip is mounted.

47. The device of claim 30, further comprising a resin packaging part encapsulating the LED chip, at least one of the plurality of phosphors being dispersed in the resin packaging part.

48. The device of claim 30, wherein the plurality of phosphors respectively form a plurality of different phosphor-contained resin layers, and the plurality of phosphor-contained resin layers have a stacked structure.

49. A phosphor emitting light, the phosphor having a β-type $Si_3N_4$ crystal structure and comprising oxynitride expressed by an empirical formula $Si_{6-z}Al_zO_zN_{8-z}:EU_a,M_b$,
M being at least one selected from among strontium (Sr) and barium (Ba), an amount (a) of europium (Eu) ranging from 100 ppm to 5000 ppm, an amount (b) of M ranging from 100 ppm to 10000 ppm, and a composition rate (z) of aluminum (Al) satisfying $0.1<z<1$, and
the phosphor having a peak wavelength ranging from 500 to 550 nm when excitation light is irradiated thereto,
wherein M is a dopant of the phosphor and is disposed in an interstitial space of the phosphor.

* * * * *